(12) United States Patent
Savu et al.

(10) Patent No.: US 6,852,781 B2
(45) Date of Patent: Feb. 8, 2005

(54) FLUOROCHEMICAL SULFONAMIDE SURFACTANTS

(75) Inventors: Patricia M. Savu, Maplewood, MN (US); Sandra A. Etienne, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 294 days.

(21) Appl. No.: 10/264,591

(22) Filed: Oct. 4, 2002

(65) Prior Publication Data

US 2003/0139549 A1 Jul. 24, 2003

Related U.S. Application Data

(62) Division of application No. 09/698,987, filed on Oct. 27, 2000.
(60) Provisional application No. 60/161,842, filed on Oct. 27, 1999.

(51) Int. Cl.$^7$ .................................................. C08K 5/43
(52) U.S. Cl. ........................ 524/168; 524/544; 526/243
(58) Field of Search ................................ 524/168, 544; 526/243

(56) References Cited

U.S. PATENT DOCUMENTS

| | | | |
|---|---|---|---|
| 2,326,634 A | 8/1943 | Gebhard et al. |
| 2,354,018 A | 7/1944 | Heltzer et al. |
| 2,378,252 A | 6/1945 | Staehle et al. |
| 2,407,680 A | 9/1946 | Palmquist et al. |
| 2,732,398 A | 1/1956 | Brice et al. |
| 2,803,615 A | 8/1957 | Ahlbrecht et al. |
| 2,809,990 A | 10/1957 | Brown |
| 3,493,403 A | 2/1970 | Tung et al. |
| 3,700,305 A | 10/1972 | Bingham |
| 3,709,706 A | 1/1973 | Sowman |
| 3,728,151 A | 4/1973 | Sherman et al. |
| 3,787,351 A | 1/1974 | Olson |
| 4,025,159 A | 5/1977 | McGrath |
| 4,248,932 A | 2/1981 | Tung et al. |
| 4,415,615 A | 11/1983 | Esmay et al. |
| 4,539,006 A | 9/1985 | Langford |
| 4,564,556 A | 1/1986 | Lange |
| 4,661,573 A | 4/1987 | Ratkowski et al. |
| 5,242,772 A | 9/1993 | Kato et al. |
| 5,274,159 A | 12/1993 | Pellerite et al. |
| 5,370,919 A | 12/1994 | Fieuws et al. |
| 5,468,352 A | 11/1995 | Jäger et al. |
| 5,502,251 A | 3/1996 | Pohmer et al. |
| 5,608,003 A | 3/1997 | Zhu |
| 5,612,431 A | 3/1997 | Waddell et al. |
| 5,688,884 A | 11/1997 | Baker et al. |
| 5,760,126 A | 6/1998 | Engle et al. |
| 6,132,861 A | 10/2000 | Kang et al. |

FOREIGN PATENT DOCUMENTS

| | | |
|---|---|---|
| EP | 0571832 | 1/1993 |
| EP | 0306756 | 3/1999 |
| JP | 55055156 | 4/1980 |
| JP | 2242811 | 9/1990 |

OTHER PUBLICATIONS

*Fluorinated Surfactants*, edited by Erik Kissa, pp. 273 and 325, Marcel Dekker, Inc. (1996).
Annual Book of ASTM Standard 2002, E 809–94a.
U.S. Defensive Publication No. T987,003, Oct. 2, 1979.
*Amphoteric Surfactants*, Second Edition, edited by Eric G. Lomax, p. 13, Marcel Dekker Inc. (1996).
*Organofluorine Chemicals and their Industrial Applications*, edited by R.E. Banks, p. 56, Ellis Harwood Ltd. (1979).
*Industrial Fluoro–Chemicals*, J.O. Hendricks, Industrial and Engineering Chemistry, vol. 45, No. 1, p. 103, (1953).
*Wetting of Low–Energy Solids by Aqueous Solutions of Highly Fluorinated Acids and Salts*, Marianne K. Bernett and W.A. Zisman, Journal of Physical,63, p. 1912, (1959).
*Long Chain Alkanoic and Alkenoic Acids with Perfluoroalkyl Terminal Segments*, N.O. Brace, Journal of Organic Chemistry, 27, p. 4491 (1962).
*Contact Angle, Wettability, and Adhesion*, W.A. Zisman, Advances in Chemistry Series, 43, p. 22, American Chemical Society (1964).
*Preparation, Properties, and Industrial Applications of Organofluorine Compounds*, edited by R.E. Banks, p. 37, Ellis Horwood Ltd. (1982).
*Fluorinated Surfactants*, edited by Erik Kissa, Chapter 4, p. 134, Marcel Dekker, Inc. (1996).

*Primary Examiner*—Bernard Lipman

(57) ABSTRACT

Described are fluorochemical surfactants derived from non-afluorobutanesulfonyl fluoride that contain polyalkyleneoxy side chains and may be copolymerized with acrylic acid or methacrylic acid to form polyacrylates or polymethacrylates. The surfactants surprisingly lower the surface tension of water and other liquids in the same or similar low values achieved by premier surfactants such as those derived from perfluorooctane sulfonyl fluoride.

19 Claims, 7 Drawing Sheets

FLUOROCHEMICAL SULFONAMIDE SURFACTANTS

This application is a divisional of application Ser. No. 09/698,987, filed Oct. 27, 2000, which claims priority of U.S. provisional application Ser. No. 60/161,842, filed Oct. 27, 1999, which application(s) are incorporated herein by reference.

FIELD OF THE INVENTION

The invention relates to fluorochemical surfactants including those derived from nonafluorobutanesulfonyl fluoride (PBSF) that have been found to be as effective as the known premier surfactants derived from perfluorooctanesulfonyl fluoride (POSF) and can be produced at lower costs.

BACKGROUND OF THE INVENTION

The art of surfactants, particularly surfactants with fluorochemical chains, shows a preference for such surfactants with longer fluorochemical chains, e.g., $C_6$-$C_{10}$ in U.S. Pat. No. 2,803,615 and $C_6$-$C_{12}$ in U.S. Pat. No. 3,787,351. Even in hydrocarbon surfactants, increasing the chain length of the hydrocarbon chain decreases the CMC (critical micelle concentration); the decrease in CMC is roughly one order of magnitude for each —$CH_2CH_2$— added to the chain (*Amphoteric Surfactants*, edited by Eric G. Lomax, Marcel Dekker Inc. (1996), p. 13). The same trend has been noted in surfactants derived from the perfluorocarboxylic acids and sulfonic acids (*Organofluorine Chemicals and their Industrial Applications*, edited by R. E. Banks, Ellis Horwood Ltd. (1979), p. 56; J. O. Hendrichs, *Ind. Eng Chem*, 45, 1953, p. 103; M. K. Bernett and W. A. Zisman, *J. Phys. Chem.*, 63, 1959, p. 1912). Data exist that suggest that only after the seven outermost carbon atoms are fully fluorinated do the contact angles of various liquids on the surface approach those of a perfluoro fatty acid monolayer (N. O. Brace, *J. Org. Chem.*, 27, 1962, p. 4491; W. A. Zisman, *Advan. Chem.* 1964, p. 22). Since models to explain the actions of surfactants often invoke the monolayer of the surfactant on the air/liquid interface, one would expect the same to be true of fluorinated surfactants, and that activity of the surfactant is closely tied to its chain length.

We have found the same trend when the surface tensions of $C_4F_9SO_3K$ and $C_8F_{17}SO_3K$ were measured in water. The results are shown in FIG. 1. We have also found that the same trend can be observed in a series of homologous fluorinated glycamide salts shown in FIG. 2. In each case the surface tension of the resulting solution of the $C_4F_9SO_2N$— containing surfactant was significantly higher at the same concentration than the $C_8F_{17}SO_2N$— containing surfactant. Based on the above, use of a $C_4F_9SO_2N$— containing surfactant in an application would be disadvantageous over a $C8F_{17}SO_2N$— containing surfactant because higher levels would be required and the end result would potentially be higher expense and adverse effects on the properties of the composition used in the application.

SUMMARY OF THE INVENTION

We have found that polymeric fluorochemical surfactants with shorter perfluoroalkyl segments, preferably those derived from perfluorobutanesulfonyl fluoride (PBSF), have surface activities that surprisingly rival that of the homologs made from perfluorooctane segments such as perfluorooctanesulfonyl fluoride (POSF). It is particularly advantageous to use PBSF in a surfactant over POSF because of the higher yield of perfluorobutanesulfonyl fluoride (58%) in electrochemical fluorination over perfluorooctanesulfonyl fluoride (31%) (*Preparation, Properties, and Industrial Applications of Organofluorine Compounds*, edited by R. E. Banks, Ellis Horwood Ltd (1982), p. 37). A significant advantage of PBSF derived surfactants over the more commonly used POSF derived surfactants is that they can be produced at a lower cost per weight because of their higher yields and still maintain their potency as surfactants at the same weight percent. Furthermore, even with less fluorine content, potent surfactant properties are surprisingly achieved.

Many previously known polymeric, fluorochemical surfactants contain perfluorooctyl moieties. These surfactants ultimately degrade to perfluorooctyl-containing compounds. It has been reported that certain perfluorooctyl-containing compounds may tend to bio-accumulate in living organisms; this tendency has been cited as a potential concern regarding some fluorochemical compounds. For example, see U.S. Pat. No. 5,688,884 (Baker et al.). As a result, there is a desire for fluorine-containing compositions which are effective in providing desired surfactant properties, and which eliminate more effectively from the body (including the tendency of the composition and its degradation products).

It is expected that the polymeric, fluorochemical surfactants of the present invention, which contain perfluorobutyl moieties, when exposed to biologic, thermal, oxidative, hydrolytic, and photolytic conditions found in the environment, will break down to various degradation products. For example, compositions comprising perfluorobutylsulfonamido moieties are expected to degrade, at least to some extent, ultimately to perfluorobutylsulfonate salts. It has been surprisingly found that perfluorobutylsulfonate, tested in the form of its potassium salt, eliminates from the body much more effectively than perfluorohexylsulfonate and even more effectively than perfluorooctylsulfonate.

Accordingly, one aspect of the present invention provides a polymeric surfactant comprising at least one unit of Formula I

I

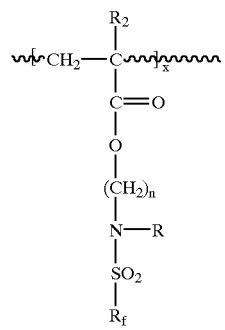

where $R_f$ is —$C_4F_9$ or —$C_3F_7$; R and $R_2$ are each independently hydrogen or alkyl of 1 to 4 carbon atoms; n is an integer from 2 to 10; and x is an integer of at least 1. In one preferred embodiment, $R_f$ is —$C_4F_9$.

Another aspect of the invention provides a polymeric surfactant prepared from the reaction products of the following monomers or oligomers:

(a) a compound of the formula

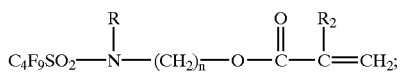

(b) a compound selected from the group consisting of

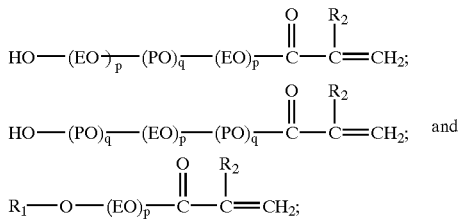

and optionally
(c) a compound of the formula

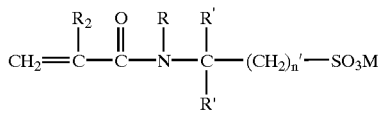

where R, $R_1$, R' and $R_2$ are each independently hydrogen or alkyl of 1 to 4 carbon atoms; n is an integer from 2 to 10; n' is an integer of 1 to 10; p is an integer of 1 to about 128 and q is an integer of 0 to about 55. M is hydrogen, a metal cation, or a protonated tertiary amine.

Another aspect of the invention provides a polymeric surfactant comprising at least one unit of Formula II:

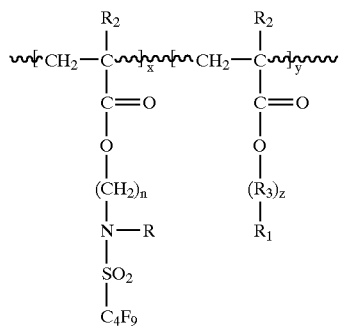

where the nonafluorobutanesulfonyl amido segment is part of a polymeric chain containing a polyalkyleneoxy segment. R, $R_1$ and $R_2$ are each independently hydrogen or alkyl of 1 to 4 carbon atoms; $R_3$ is at least one or more straight or branched alkylene-oxy groups, linked together when more than one, having 2 to 6 carbon atoms; n is an integer from 2 to 10; and x, y and z are integers of at least 1.

The present invention also includes mixtures thereof in forms of surfactant compositions as well as methods of using the surfactants.

One embodiment of the present invention provides a method of reducing the surface tension of a liquid comprising adding to said liquid a surfactant composition of this invention. Another embodiment of the invention provides a method of increasing the wetting of a coating mixture on a substrate by adding to the coating mixture of surfactant composition of this invention. In one embodiment of the invention, the surface tension of a liquid can be reduced by adding to said liquid a surfactant mixture comprising a compound of Formula I or Formula II and a compound of Formula III

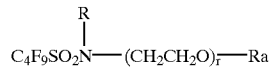

in which R is hydrogen or alkyl of 1–4 carbon atoms; $R_a$ is a hydrogen or an alkyl of 1 to 4 carbon atoms; and r is an integer of 2 to 20. Preferably, R and $R_a$ are methyl and r is an integer from 4 to 10.

A more detailed description of the present invention including particular embodiments is described hereinafter.

Figure 1:
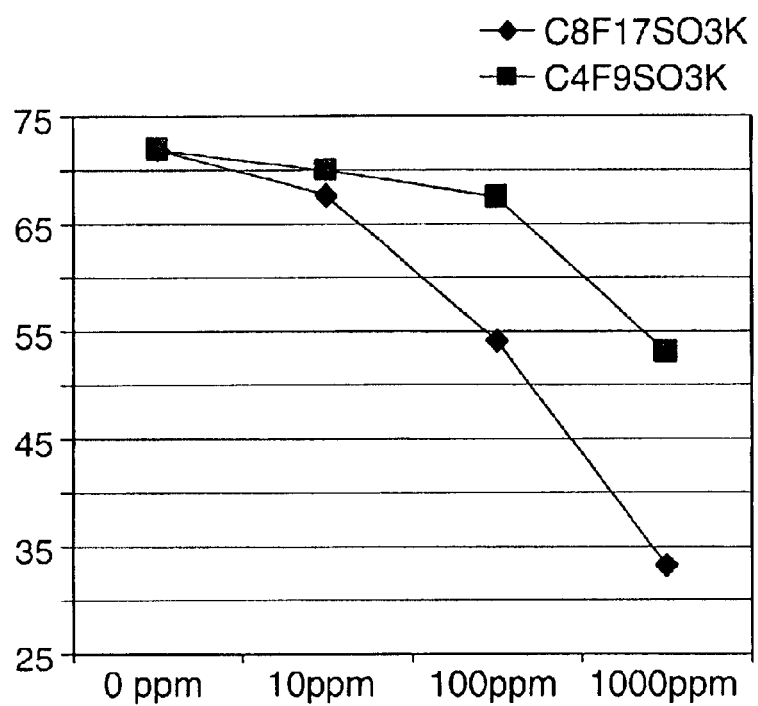
FIG. 1 is a graphic comparison of the surface tensions in water of $C_8$ and $C_4$ perfluorosulfonates.

DETAILED DESCRIPTION OF THE
ILLUSTRATIVE EMBODIMENTS OF THE
INVENTION

Compound of the Invention

The present invention provides a polymeric surfactant comprising at least one unit of Formula I

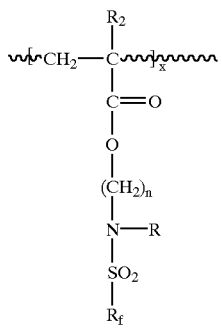

where $R_f$ is —$C_4F_9$ or —$C_3F_7$; R and $R_2$ are each independently hydrogen or alkyl of 1 to 4 carbon atoms; n is an integer from 2 to 10; and x is an integer of at least 1.

Preferred surfactants of formula I are those where $R_f$ is —$C_4F_9$. Other preferred surfactants are those in which R and $R_2$ are each independently hydrogen or methyl and $R_f$ is —$C_4F_9$. Still other preferred embodiments include the surfactant of Formula I where n is 2.

The invention includes polymers in which there is at least one fluorochemical portion. In one preferred embodiment, the fluorochemical portion is a nonafluorobutanesulfonyl amido segment. The nonafluorobutanesulfonyl amido segments are combined with a reactive portion such as an acrylate or methacrylate group. The polymers may be, for example, polyacrylates, polymethacrylates, polyalkyleneoxy, or mixtures thereof.

In another aspect, the invention provides for short chain fluorochemical surfactants derived from nonafluorobutanesulfonyl amido segments that contain poly(alkyleneoxy) moieties. The invention also includes copolymers which are polyacrylates containing at least one nonafluorobutanesulfonyl amido segment and polyalkyleneoxy moieties. The invention also provides for mixtures of the individual monomers thereof or mixtures of an acrylate or methacrylate derivative of nonafluorobutanesulfonyl amido and corresponding polyalkyleneoxy acrylate or methacrylate copolymers.

The nonafluorobutanesulfonyl amido containing surfactants of the present invention are those in which a plurality of nonafluorobutanesulfonyl amido segments are linked to polyalkyleneoxy moieties through a polymeric chain. The polyalkyleneoxy moieties are particularly useful because they are soluble over a wide range of polarity and, by alteration of the carbon-oxygen ratio, can be tailored for any particular matrix. These copolymeric surfactants are nonionic or they can be ionic by inclusion of ionic segments. While normally liquid or low melting solids, the coplymeric surfactants can be in the form of a very thick glass in the absence of a solvent. They are soluble in polar synthetic resinous compositions and have about 5 to 30 weight %, preferably 10 to 25 weight %, carbon-bonded fluorine based on the weight of the copolymer.

As polyalkyleneoxy moieties, $R_3$ is at least one or more straight or branched alkyleneoxy groups having 2 to 6 carbon atoms, preferably 2 to 4 carbon atoms, most preferably 2 or 3 carbon atoms such as ethyleneoxy or propyleneoxy. When ethyleneoxy and propyleneoxy units are linked together, they form polyethyleneoxy or polypropyleneoxy blocks or a mixture of blocks. The oxypropylene units can be branched or linear.

Particularly preferred of these are those containing one polyoxypropylene and having at least one other block of polyoxyethylene attached to the polyoxypropylene block. Additional blocks of polyoxyethylene or polyoxypropylene can be present in a molecule. These materials having an average molecular weight in the range of about 500 to about 15,000 are commonly available as PLURONIC™ manufactured by the BASF Corporation and available under a variety of other trademarks from other chemical suppliers. In addition, polymers called PLURONIC™ R (reverse Pluronic structure) are also useful in the invention.

Particularly useful polyoxypropylene polyoxyethylene block polymers are those comprising a center block of polyoxypropylene units and blocks of polyoxyethylene units to each side of the center block. These copolymers have the formula shown below:

$(EO)_n$-$(PO)_m$-$(EO)_n$ wherein m is an integer of about 21 to about 54 and n is an integer of about 7 to about 128. Additional useful block copolymers are block polymers having a center block of polyoxyethylene units and blocks of polyoxypropylene units to each side of the center block. The copolymers have the formula as shown below:

$(PO)_n$-$(EO)_m$-$(PO)_n$ wherein m is an integer of about 14 to about 164 and n is an integer of about 9 to about 22.

Another preferred polyalkyleneoxy moiety useful in the co-polymers of the present invention containing a nonafluorobutanesulfonamido segment are those derived from polyethylene glycols having a molecular weight of about 200–10,000. Suitable commercially available polyethylene glycols are available from Union Carbide under the trade name CARBOWAX™.

Another necessary part of the copolymeric surfactants of the present invention is acrylate and/or methacrylate moieties that form part of the starting monomers as well as the final polyacrylate products. Nonafluorobutanesulfonamido acrylate starting materials or monomers can be copolymerized with monomers containing polyalkyleneoxy moieties to form surface-active agents. Thus, the polyacrylate surfactants of the present invention can be prepared, for example, by free radical initiated copolymerization of a nonafluorobutanesulfonamido radical-containing acrylate with a polyalkyleneoxyacrylate, e.g., monoacrylate or diacrylate or mixtures thereof. Adjusting the concentration and activity of the initiator, the concentration of monomers, the temperature, and the chain-transfer agents can control the molecular weight of the polyacrylate copolymer. The description of the preparation of such polyacrylates is for example described in U.S. Pat. No. 3,787,351, which patent is incorporated herein. The starting nonafluorobutanesulfonamido acrylates described above are also known in the art, e.g., U.S. Pat. No. 2,803,615, which patent is also incorporated herein by reference.

The polyalkyleneoxy acrylates used in the above preparation can be prepared from commercially available hydroxypolyethers or polyoxyalkylene hydroxy compounds such as, for example, the PLURONIC™ or CARBOWAX™ polymers. Such hydroxy materials are reacted in a known manner with acrylic acid, methacrylic acid, acrylyl chloride or acrylic anhydride. Alternatively, a polyalkyleneoxy diacrylate, prepared in a known manner similar to the monoacrylates, can be copolymerized with the nonafluorobutanesulfonamido acrylate to obtain a polyacrylate copolymer of the present invention.

The above polymeric surfactant may also contain, if desired, a water-solubilizing polar group that may be anionic, nonionic, cationic or amphoteric. Preferred anionic groups include, but are not limited to, sulfonates (e.g., —SO$_3$M), sulfates (e.g., —OSO$_3$M), and carboxylates (e.g., —C(=O)OM). M is hydrogen, a metal cation such as an alkali or alkaline earth metal cation (e.g., sodium, potassium, calcium or magnesium, and the like), or a nitrogen-based cation, such as, for example, ammonium or a protonated tertiary amine (e.g. (HOCH$_2$CH$_2$)$_2$N$^\oplus$HCH$_3$). The sulfonate polar groups are employed as oligomers or polymers that include polyacrylates and polyacrylamides. A particularly useful monomer or oligomer employed in the present invention, if desired to provide water-solubilizing polar groups, is a polyacrylamide sulfonate of the formula

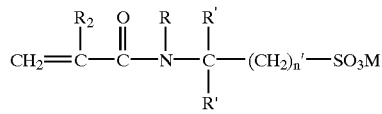

wherein R$_2$ and R are as defined above;

R' is hydrogen, or alkyl of 1–4 carbon atoms, especially methyl;

n' is an integer of 1 to 10, and

M is hydrogen, a metal cation, or a protonated tertiary amine.

A preferred anionic group is 2-acrylamido-2-methyl-1-propanesulfonic acid (AMPS) or the potassium salt thereof.

Representative useful cationic water-solubilizing groups include, for example, ammonium or quaternary ammonium salts. Preferred monomers that provide cationic water-solubilizing groups include dimethylaminoethyl methacrylate, dimethylaminoethyl acrylate, and the like. For example, the surfactant may be made incorporating compounds of the formula A-O—C(=O)C(R$_2$)=CH$_2$ wherein A is an amine-containing group.

The present invention in another general aspect includes a polymeric surfactant prepared from the reaction product of the following monomers or oligomers:

(a) a compound of the formula

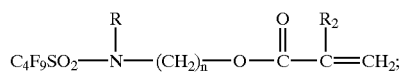

(b) a compound selected from the group consisting of

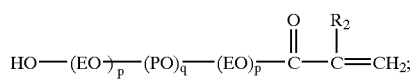

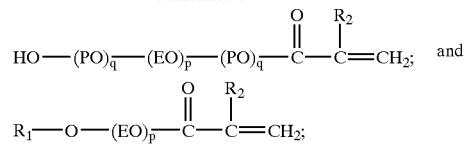

and optionally (c) a compound of the formula

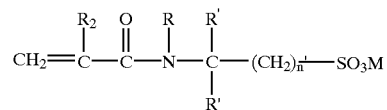

where R, R$_1$, R' and R$_2$ are each independently hydrogen or alkyl of 1 to 4 carbon atoms; n is an integer from 2 to 10; n' is an integer of 1 to 10; p is an integer of 1 to about 128 and q is an integer of 0 to about 55. M is hydrogen, a metal cation, or a protonated tertiary amine.

The compound containing the nonafluorobutanesulfonamido segment can also be used in a monomeric mixture form or mixture of monomers and polymers or copolymers.

To enhance compatibility with various components found in many adhesive and binder systems, it may be desired to include long chain alkyl compounds in the surfactant. For example, the surfactant may be made incorporating compounds of the formula R$_h$—O—C(=O)C(R$_2$)=CH$_2$ wherein R$_h$ is an alkyl of 12 to 20 carbon atoms.

The present invention includes a polymeric surfactant of Formula II

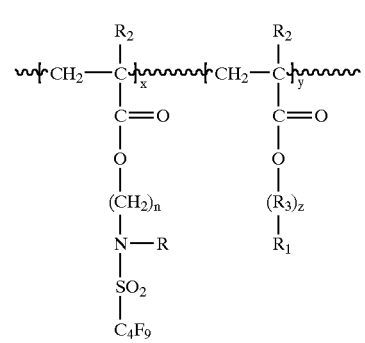

where the nonafluorobutanesulfonyl amido segment is part of a polymeric chain containing a polyalkyleneoxy moiety. R, R$_1$ and R$_2$ are each independently hydrogen or alkyl of 1 to 4 carbon atoms; R$_3$ is at least one straight or branched polyalkylene-oxy group, linked together when more than one, having 2 to 6 carbon atoms, or a straight or branched alkylene group having 12 to 20 carbon atoms; n is an integer from 2 to 10; and x, y and z are integers of at least 1.

Preferred surfactants of Formula II are those where R, R$_1$, and R$_2$ are each independently hydrogen or methyl. Other preferred embodiments include the surfactant of Formula I where n is 2.

In one particular aspect of the surfactant of Formula I, the polyalkene oxide group, $R_3$ is of the formulae A or B:

$(EO)_p\text{-}(PO)_q\text{-}(EO)_p$           (A)

or $(PO)_q\text{-}(EO)_p\text{-}(PO)_q$           (B)

wherein p is an integer of 1 to about 128 and q is an integer of 0 to about 54.

A particularly preferred embodiment is employing a CARBOWAX™ moiety where $R_3$ in the surfactant of Formula II is a polyalkylene oxide group of formula B, q is 0 and p is about 17. R and $R_1$ are methyl.

Alternatively, another preferred embodiment is a copolymer surfactant where the polyalkyleneoxy moiety is derived from a polyalkylene oxide of formula A where q is an integer of about 9 to about 22 and p is an integer of about 14 to about 164. More preferred is a copolymeric surfactant where the ethylene oxide moieties are on the outside of the block copolymer with propylene oxide and p is an integer of about 7 to about 128 and q is an integer of about 21 to about 54. Most preferred is the copolymeric surfactant containing the moiety of formula A where p is about 11 and q is about 21. In this particular embodiment, the copolymeric surfactant is that described in the above Formula II where R is methyl.

In one embodiment of the invention the surfactant is a mixture comprising a compound of Formula I or Formula II and a compound of Formula III

III

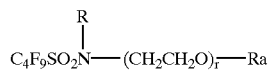

in which R and $R_a$ are independently hydrogen or alkyl of 1–4 carbon atoms and r is an integer of 2 to 20. Preferably, R and $Ra_1$ are methyl and r is an integer from 4 to 10.

All of the nonafluorobutylsulfonamido-containing structures described above may be made with heptafluoropropylsulfonamido groups by starting with heptafluoropropylsulfonyl fluoride, which can be made by the methods described in Examples 2 and 3 of U.S. Pat. No. 2,732,398 (Brice et al.). Using the methods described in the examples below, the heptafluoropropylsulfonyl fluoride can then be converted to N-methylheptafluoropropylsulfonamide, N-methylheptafluoropropylsulfonamidoethanol, $C_3F_7SO_2N(CH_3)(CH_2CH_2O)_{7.5}CH_3$, N-methyl-heptafluoropropylsulfonamidoethyl acrylate, N-methyl-heptafluoropropylsulfonamidoethyl methacrylate, and the copolymers corresponding to those described with nonafluorobutylsulfonamido groups.

Methods of Use

The surfactants of the present invention have similar beneficial properties and can be used for the same purposes as the premier surfactants, such as a corresponding perfluorooctanesulfonamido surfactant. Surprisingly, the surfactants of the present invention lower the surface tension of water and other liquids to the same or lower values than achieved by premier surfactants derived from perfluorooctanesulfonyl fluoride. Similarly, the surfactants of the present invention can improve the wetting of a liquid or coating mixture on a substrate to an extent comparable to the premier surfactants.

The surfactants of this invention can be used individually or in combination to produce the desired surface tension reduction or wetting improvement.

One aspect of this invention provides a method of reducing the surface tension of a liquid by adding to the liquid a surface-active agent of the formula

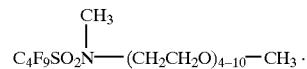

In another embodiment of the invention, adding a surfactant mixture comprising a compound of Formula I or Formula II and a compound of Formula III reduces the surface tension of a liquid

III

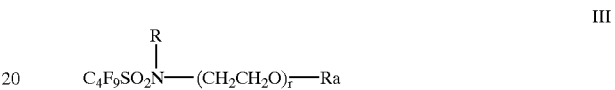

in which R and $R_a$ are independently hydrogen or alkyl of 1–4 carbon atoms and r is an integer of 2 to 20. Preferably, R and $R_a$ are methyl and r is an integer from 4 to 10.

Fluorochemical surfactants of the present invention have been found to be surprisingly effective in a number of applications. In one application, cellular polymeric membranes are made using fluorochemical surfactants of the present invention. The surfactants provide for and control the formation of a large number of small cells or voids in the membrane, which leads simultaneously to the formation of a cellular membrane with low density and an opaque, uniform appearance. The properties and methods of making cellular pressure-sensitive adhesive (PSA) membranes of this type are described in U.S. Pat. No. 4,415,615 (Esmay, et al), incorporated herein by reference. Cellular PSA membranes or foam tapes can be made not only by forming a cellular polymeric membrane that has PSA properties, but also by applying a layer of PSA to at least one major surface of a cellular polymeric membrane. Preferred fluorochemical surfactants for this application comprise (a) one or more compounds having a perfluorobutanesulfonamide segment and comprising a polyalkyleneoxy segment and (b) one or more polymers comprised of the reaction products of a fluorochemical monomer, a nonionic polar monomer, and optionally an ionic polar monomer. The fluorochemical portion of the fluorochemical monomer is perfluorobutyl and the reactive portion of the fluorochemical monomer is preferably acrylate or methacrylate. The nonionic polar monomer is preferably a poly(ethyleneoxide) acrylate. The optional ionic polar monomer is preferably dimethylaminoethyl methacrylate, 2-acrylamido-2-methyl-1-propanesulfonic acid, methacrylic acid, acrylic acid, and mixtures thereof.

In another application fluorochemical surfactants of the present invention have been found to be a very effective surface treatment for optical elements such as glass or ceramic beads, thus enabling the beads to float on the surface of organic binder resins used in the manufacture of pavement marking and retroreflective sheeting constructions. Floatation of the beads is an effective means of producing an array of beads all lying in essentially the same plane with each bead protruding from the binder resin, and thereby having an air interface. Preferred fluorochemical surfactants for this application comprise one or more polymers formed from the reaction products of a fluorochemical monomer, a nonionic polar monomer, and an ionic polar monomer. The fluorochemical portion of the fluorochemical monomer is perfluorobutyl and the reactive portion of the fluorochemical monomer is preferably acrylate or methacrylate. The nonionic polar monomer is preferably a poly(ethyleneoxide) acrylate. The ionic polar monomer is preferably dimethylaminoethyl methacrylate, 2-acrylamido-2-methyl-1-propanesulfonic acid, acrylic acid, and mixtures thereof, with 2-acrylamido-2-methyl-1-propanesulfonic acid being most preferred.

In many retroreflective materials, glass or ceramic beads function as the optical elements. Preferred properties of the optical elements in general are described herein with respect to glass beads. The glass or ceramic beads are fixed in place by means of a cured liquid binder. Because the glass or ceramic beads have a density or specific gravity several times that of the liquid binder, they tend to sink into the liquid binder layer rather than float on the surface. The glass or ceramic beads are coated with a surface treatment that alters the floatation properties of the beads in the liquid binder. "Float", and derivations thereof, refers to the beads assuming a position wherein slightly more than half of each bead is submerged. The liquid binder preferably contacts the embedded beads only up to 5 to 30° above their equators. The floatability of the glass or ceramic beads can be affected to some extent by the particle size, particle size distribution, surface chemistry and chemical make-up of the particular beads as well as the chemical make-up, density, and viscosity of the binder. In general, however, only about 10% or less of the glass beads tend to float in heptane test liquid in the absence of an effective surface treatment.

The diameter of optical elements such as ceramic or glass beads typically ranges from a few microns to approximately 2500 microns and is preferably from about 10 to 1000 microns. Ordinary glass beads typically have a density of about 2.5 and a refractive index of about 1.5. "High index" beads refers to beads having a density of about 3.5 and a refractive index of about 1.9, whereas "super high index" typically refers to beads having a density of about 5 and a refractive index of about 2.6 or higher.

In general, ceramic microsphere optical elements are comprised of metal oxides that are substantially colorless. Suitable metal oxides include $Al_2O_3$, $SiO_2$, $ThO_2$, $SnO_2$, $TiO_2$, $Y_2O_3$ and $ZrO_2$ with the oxides of zirconium, silicon, and titanium being preferred. The ceramic microspheres can exhibit a range of properties, depending on the kind and amounts of the various metal oxides employed as well as the method of manufacture. Preferred, however, are dense microspheres having substantially no open porosity that have an average hardness greater than sand. Additional information concerning the desired properties for various end-uses and methods of manufacture of microspheres (e.g., sol-gel process) can be found in U.S. Pat. Nos. 3,493,403; 3,709,706; and 4,564,556; incorporated herein by reference.

Glass beads suitable for use as optical elements in the invention are also commercially available from Flex-O-Lite Corporation, Fenton, Mo. and Nippon Electric Glass, Osaka, Japan.

In addition to having the desired particle size and refractive index, the optical elements are typically transparent. The term transparent means that when viewed under an optical microscope (e.g., at 100x) the microspheres have the property of transmitting rays of visible light so that bodies beneath the microspheres, such as bodies of the same nature as the microspheres, can be clearly seen through the microspheres when both are immersed in oil of approximately the same refractive index as the microspheres. The outline, periphery or edges of bodies beneath the microspheres are clearly discernible. Although the oil should have a refractive index approximating that of the microspheres, it should not be so close that the microspheres seem to disappear as would be the case of a perfect match.

The surface treatment can be present on the optical elements in an amount sufficient such that at least about 50% of the optical elements float in heptane. Preferably, the treatment of the optical elements with the surfactant (surface-active agent) improves the floatability such that greater than about 80% of the optical elements float in heptane and more preferably about 90–100% of the optical elements float in heptane. The amount of fluorochemical compound employed for coating the optical elements typically ranges from about 10 ppm to about 1000 ppm with respect to the weight of the optical elements. A preferred fluorochemical compound is one that contributes the desired floatation at minimum concentrations. The amount of fluorochemical compound is usually about 600 ppm or less, preferably about 300 ppm or less, more preferably about 150 ppm or less, even more preferably about 100 ppm or less, and most preferably about 50 ppm or less. Typically, the overall coating thickness of the surface treatment of the present invention is greater than about 15 Angstroms, preferably, greater than about 20 Angstroms, and more preferably, greater than about 50 Angstroms. Thicker coatings can be obtained if desired, although it is preferred that the coating thickness be no greater than about 500 Angstroms, more preferably, no greater than about 300 Angstroms, and most preferably, no greater than about 150 Angstroms thick.

The fluorochemical compositions described herein for use as surface treatments for optical elements are typically liquids. The surface treatments are combined with various solvents to form an emulsion, solution, or dispersion. The emulsion(s), solution(s), and dispersion(s) are then further diluted in order to deliver the desired concentration. It is assumed that negligible amounts of the diluted surface treatment are lost and substantially all of the surface treatment present in the emulsion, solution, or dispersion is deposited on the optical elements. Although aqueous emulsions, solutions, and dispersions are preferred, up to about 50% of a co-solvent such as methanol, isopropanol, or methyl perfluorobutyl ether may be added. Preferably, the aqueous emulsions, solutions, and dispersions comprise less than about 30% co-solvent, more preferably less than about 10% co-solvent, and most preferably the aqueous emulsions, solutions, and dispersions are substantially free of co-solvent. The aqueous surface treatment is coated on the optical elements, typically, by combining the optical elements and the aqueous surface treatment and then drying the coated elements. Although aqueous delivery is preferred, the surface treatment could also be applied by other techniques such as vapor deposition.

In addition to the improvement in floatation of the glass or ceramic beads, it is also important that the surface treatment does not adversely affect the adhesion of the glass beads with the cured liquid binder. The adhesion can be evaluated in several ways. The initial adhesion can be determined subjectively by estimating the extent to which the glass or ceramic beads are embedded after curing. The beads are preferably embedded to about 40–70%, and more preferably to about 40–60% of their diameters. Another way of evaluating adhesion is accelerated aging evaluations. A piece of cured glass or ceramic bead-embedded binder is conditioned in boiling water for 24 hours. After conditioning, the beads are preferably embedded to the same extent as prior to conditioning and the individual glass beads are difficult to remove with a dissection probe. Yet, another way to evaluate adhesion is comparative tensile testing. A uniform slurry of binder and untreated beads at a ratio of about 1 to 3 is coated as a film having a thickness of about 0.4 mm. A second slurry of binder and surface treated beads employing the same ratio of ingredients and is coated in a comparable manner. After the coatings are fully cured, the samples are conditioned for 24 hours in water at ambient temperature. Tensile testing is conducted with a 2.54 cm wide sample employing a 5.08 cm gap at a rate of 1.27 cm/minute. The stress required to break the sample containing the surface treated beads is about the same as or preferably greater than the control sample containing untreated beads (greater than or equal to about 90% of the standard deviation of the average value).

In addition to the surface treatment of the invention, the optical elements may comprise one or more additional surface treatments such as adhesion promoters and flow control agents. Various silanes such as γ-aminopropyl triethoxysilane are commonly employed as adhesion promoters, whereas methacrylato chromic chloride, commercially available from Zaclon Inc., Cleveland Ohio, under the trade designation "Volan" is a typical flow control agent.

The surface treated optical elements of the invention can be employed for producing a variety of reflective products or articles such as pavement markings, retroreflective sheeting, and beaded projection screens. Such products share the common feature of comprising a liquid binder layer and embedding a multitude of optical elements into the binder surface followed by solidifying the binder to retain the optical elements in place. In pavement markings, retroreflective sheeting, and beaded projection screens of the invention, at least a portion of the optical elements will comprise the surface treated optical elements of the invention. Typically, the majority of, and preferably substantially all of the optical elements employed in the manufacture of the reflective products will comprise surface treated optical elements of the invention.

Various known binder materials may be employed including one or two-part liquid curable binders, as well as thermoplastic binders wherein the binder attains a liquid state via heating until molten. Common binder materials include polyacrylates, polymethacrylates, polyolefins, polyurethanes, polyepoxides, phenolics, and polyesters. For reflective paints, the binder layer may contain reflective pigment. For reflective sheeting, the binder material itself is typically transparent and the binder layer comprises one or more colorants, e.g., dyes and pigments. Transparent binders can be applied to a reflective base or to a release-coated support. With a release-coated support, the beaded film is stripped away after solidification. The film may then be applied to a reflective base or be given a reflective coating or plating.

There are several types of retroreflective article in which the surface treated optical elements may be used such as exposed lens (e.g., U.S. Pat. Nos. 2,326,634 and 2,354,018), embedded lens (e.g., U.S. Pat. No. 2,407,680), and encapsulated lens (e.g., U.S. Pat. No. 4,025,159) retroreflective sheeting. Retroreflective sheeting can be prepared by known methods including a method comprising the steps of: (i) forming a top coat on a release-coated web (e.g., coating a solution of hydroxy-functional acrylic polyol and aliphatic polyfuntional isocyanate onto a release-coated paper web and then curing by conveying the coating through an oven at about 150° C. for about 10 minutes); (ii) coating the exposed surface of the top coat with a liquid binder (e.g. coating a solution comprising an oil-free synthetic polyester resin and a butylated melamine resin); (iii) drying the binder to form an uncured tacky bead-bond layer; (iv) cascade-coating onto the bead-bond layer a plurality of glass microspheres forming a monolayer of embedded glass microspheres; (v) curing the bead-containing bead-bond layer to a non-tacky state (e.g., by heating to 150° C.); forming a space coat layer over the bead-containing bead-bond layer (e.g., coating a 25% solids solution comprised of a polyvinylbutyral resin and a butylated melamine resin in a solvent and curing at 170° C. for about 10 minutes); (vi) applying a reflective layer over the space coat layer (e.g., via vapor deposition of aluminum metal at a thickness of about 100 nm); and stripping away the release-coated web. An adhesive layer is typically applied to the reflective layer (e.g., by coating a 0.025 mm thick layer of an aggressive acrylic pressure-sensitive adhesive onto a silicone-treated release liner and pressing the adhesive against the reflective layer).

The surface treated optical elements are also useful in pavement marking materials. The optical elements can be incorporated into coating compositions that generally comprise a film-forming material having a multiplicity of optical elements dispersed therein. The surface treated optical elements may also be used in drop-on applications for such purposes as highway lane striping in which the optical elements are simply dropped onto wet paint or hot thermoplastic and adhered thereto.

One typical pavement-marking sheet is described in U.S. Pat. No. 4,248,932. This sheet material is a prefabricated strip adapted for lying on and securing to pavement for such purposes as lane dividing lines. The pavement-marking sheet comprises a base sheet, such as a soft aluminum foil which is conformable to a roadway surface; a top layer (also called the support film or binder film) adhered to one surface of the base sheet and being very flexible and resistant to rupture; and a monolayer of surface treated optical elements such as transparent microsphere lens elements partially embedded in the top layer in a scattered or randomly separated manner. The pavement marking sheet construction may also include an adhesive (e.g., pressure sensitive, heat or solvent activated, or contact adhesive) on the bottom of the base sheet. The base sheet may be made of an elastomer such as acrylonitrile-butadiene polymer, polyurethane, or neoprene rubber. The top layer in which the surface treated microspheres are embedded is typically a polymer such as vinyls, polyurethanes, epoxies, and polyesters. Alternatively, the surface treated microsphere lenses may be completely embedded in a layer of the pavement-marking sheet.

Processes known in the art may be used to make pavement-marking sheets (see e.g., U.S. Pat. No. 4,248, 932). One process comprises the steps of: (i) coating onto a base sheet of soft aluminum (50 micrometers thick) a mixture of resins (e.g., epoxy and acrylonitrile butadiene elastomer mixture), pigment ($TiO_2$) and solvent (e.g., methylethylketone) to form the support film; (ii) dropping onto the wet surface of the support film ingredients a multiplicity of optical elements surface treated with surfactants of this invention; and curing the support film at 150° C. for about 10 minutes. A layer of adhesive is then usually coated on the bottom of the base sheet.

Pigments or other coloring agents may be included in the top layer in an amount sufficient to color the sheet material for use as a traffic control marking. Titanium dioxide will typically be used for obtaining a white color; whereas, lead chromate will typically be used to provide a yellow color.

A rear projection screen is a sheet-like optical device having a relatively thin viewing layer that is placed at an image surface of an optical projection apparatus. Rear projection screen displays comprising glass microspheres embedded in an opaque matrix are known from U.S. Pat. No. 2,378,252, for example. Generally, the size of the microspheres is less than about 150 microns. For maximum brightness, the microspheres have an index of refraction of less than about 1.8 and preferably from about 1.45 to about 1.75. A plurality of the surface treated glass microspheres are attached to and are in intimate contact with a major surface of a transparent substrate. Alternatively, a diffusion layer can be formed by coating an optically inhomogeneous material as a separate layer onto the transparent substrate prior to application of the opaque binder and microspheres. Rear projection screens are prepared by i) providing a substrate (e.g., polyester, polycarbonate) having an opaque binder disposed thereon (e.g., acrylate loaded with carbon black to make it opaque); and ii) applying the surface treated glass microspheres under conditions effective to produce microspheres in optical contact with the substrate and embedded in the opaque matrix.

A specular reflective means can be provided by vapor depositing a layer of metal (e.g., aluminum) on the surface treated microspheres. Another useful specular reflective means can be a dielectric reflector which comprises one or more layers of a transparent material behind the microspheres where each layer has a refractive index of about 0.3 higher or lower than that of the adjacent layer or beads and each layer has an optical thickness corresponding to an odd numbered multiple of about ¼ wavelength of light in the visible range. More detail on such dielectric reflectors is found in U.S. Pat. No. 3,700,305.

In yet another application, fluorochemical surfactants of the present invention have been found to be useful as oil well stimulation additives as shown by their ability to form a stable foam with water that is saturated with a hydrocarbon. The low surface energy provided by these surfactants results in faster and more complete stimulation load recovery with less blockage of capillaries by trapped water. Under normal operations at an oil field, water is pumped daily through injector wells and down into the reservoir several thousands of feet below ground in an attempt to pressurize the reservoir and force the hydrocarbons toward the producing wells. On a monthly to yearly basis, a foam is pumped through the injector wells. The foam is formed by mixing the aqueous solution containing the fluorochemical surfactant (at about 0.1 to about 1 weight percent based on the weight of the solution) with a gas such as carbon dioxide or nitrogen. The foam reduces the amount of fluid needed to pressurize the reservoir. Also, the foam increases the level of hydraulic push and is more effective in permeating the crevices of the rock. The fluorochemical surfactant in the foam maintains the foam quality and small bubble size at elevated temperatures and in the presence of dissolved hydrocarbons. Representative useful fluorochemical surfactants for this application are as described above for bead floatation. Preferred surfactants are comprised of both anionic and cationic groups (amphoteric), either within the same surfactant molecule or as a mixture of surfactant molecules, some having anionic groups and some having cationic groups.

In certain other applications the fluorochemical surfactants of the present invention are used as coating additives to provide better wetting of the coating to a substrate surface, or better wetting of a component within the coating formulation, for example, enhancing the wetting characteristics of a thickening agent. When used in water borne coatings, the fluorochemical surfactants are formulated into an aqueous solution or dispersion at a final concentration of about 0.001 to about 0.1 weight percent based on the weight of the solution or dispersion. The formulated product can be used in many coating applications such as floor polishes and finishes, varnish for a variety of substrates, including wood floors, water borne gel applied in the manufacture of photographic film, automotive topcoats, and marine coatings. The fluorochemical surfactants can be used in other protective thin layer coatings as well, by preparing a formulation containing a surfactant, a powder, or a liquid mixture with organic solvents, fillers, and resins, including but not limited to epoxies, urethanes, acrylics, and the like. Typically, the surfactant concentration is about 0.1 to about 0.5 weight percent based on the weight of the formulation. Specific uses for these protective coatings include, for example, corrosion resistance coatings on electronic components for the computer and telecommunications industry, signage, office furniture, and pipes. Application methods of the above coating include dip coating, brushing, spraying, flow coating, and the like. The coatings are typically applied, dried, and cured, leaving the finished product with a solid coating. As an example, the surfactants have been found to be extremely effective in providing smooth clear polyurethane coatings without coating defects on surfaces that are difficult to wet, such as oily surfaces. Preferred fluorochemical surfactants for this application comprise one or more polymers comprised of the reaction products of a fluorochemical monomer, and a nonionic polar monomer. The fluorochemical portion of the fluorochemical monomer is perfluorobutyl and the reactive portion of the fluorochemical monomer is preferably acrylate or methacrylate. The nonionic polar monomer is preferably a poly(ethyleneoxide)/poly(propylene oxide)/poly(ethylene oxide) acrylate. As another example, the fluorochemical surfactants of the present invention have been found to be effective in floor finishes, providing excellent wetting and thereby a smooth, even appearance. Useful and preferred surfactants for this application are as described for the bead floatation application.

In still other applications, the fluorochemical surfactants of the present invention can be used as wetting agents or additives in photoresists, developers, and cleaning solutions in the manufacture of electronic materials. When used in photoresists, the surfactants provide a dramatic decrease in defect densities. The surfactant is mixed in a solvent solution to a final concentration of about 0.01 to about 0.1 weight percent based on the weight of the solution, and the mixture is coated onto electronic parts, typically by spin coating. For example, the mixture is dropped onto a wafer while it is spinning, forming an even coating on the wafer. In subsequent processing, a portion of the coating on the wafer is stripped with alkaline cleaners, etched with strongly oxidizing gases, or removed with solvents such as acetone. The remaining coating is cured on the article. When used in developer and cleaning solutions, the fluorochemical surfactant enables removal of contaminants from microchannels, which affects resolution and is critical to device operation. The surfactants provide low surface energy and chemical/thermal stability, allowing smaller critical dimensions (increased resolution) in the product as well as improved processor speeds and manufacturability. The fluorochemical surfactant is mixed in an aqueous solution to a final concentration of about 0.005 to about 0.05 weight percent based on the weight of the developer or cleaning solution. The mixture is transferred to a bath, and the electronic parts are either dipped or run through the bath on a conveyor belt.

In a further application, the fluorochemical surfactants of the present invention are useful in hard surface cleaning solutions to provide improved wetting of the hard surface and the contaminants to be removed. A cleaning solution is formulated to include about 0.005 to about 0.05 weight percent surfactant based on the weight of the cleaning solution. The cleaning solution is placed in a dispensing container such as a spray bottle or refill container for the spray bottle. Upon use, the cleaning solution is sprayed or otherwise applied to a hard surface such as window glass, a mirror, or ceramic tile, and the surface is wiped clean with a paper or fabric wipe.

In yet another application, the fluorochemical surfactants of the present invention are useful to enhance the wetting characteristics of thickening agents to form gels for solidifying or encapsulating medical waste. The surfactant is mixed with ethanol and applied to partially neutralized polyacrylic acid resin, typically having an average particle size of about 500–800 microns. Other ingredients may be added to eliminate biological hazards and transform biological waste into non-hazardous waste. The ethanol is evaporated and the treated resin (about 0.5 to about 1.5 percent by weight surfactant based on the weight of the resin) in powder form is packaged and ready for use. The resulting product may be used in a variety of ways, including absorption of biological fluids generated, for example, in an operating room, and encapsulation of sharps generated in a host of medical procedures. The powder can be added to biological fluids that wet the resin particles, causing gelation to occur. The sharps can be placed in a container, for example, containing the powder, and when water is added the powder gels around the sharps. In both instances, the container is disposed of as a solid non-hazardous waste.

The fluorochemical compounds may be used in making and processing semiconductors. Here the fluorochemical surfactants of the present invention may serve as low surface tension additives for buffered HF to increase wetting in oxide etching, as low surface tension and fast dynamic response additives for better wetting in spin-on photoresist coating, as low surface tension additives for aqueous developers for better wetting in resist developing and removal, as additives for reducing surface tension of electroplated copper in integrated circuits manufacturing, as additives for reducing surface tension of electroless copper to improve small hole and blind view yields in printed wiring boards, as low surface tension and fast dynamic response additives for better wetting in spin and immersion wafer cleaning, etching, and drying, as low surface tension and fast dynamic response additives for better wetting in spin-on dielectric coating, as low surface tension and fast dynamic response additives for better wetting in chemical and mechanical polishing of oxide and metal films, and as transparent surfactants for 157 nm resists.

The fluorochemical surfactants of the present invention may be used as leveling additives for various resist inks for electronics and semiconductors, for inks such as gravure coat, screen print and thermal print, for adhesive layer for Wafer polishing and Wafer CMP solutions, for hard coats for plastic lenses, and for lubricant spray coatings. The surfactants may be used as leveling or wetting additives for films such as film condenser, microfilm, medical X-ray film, and APS film. The surfactants of the invention may also be used as wetting and lubricant additives for methon, urethane, epoxy, acrylic, polyimide, and other materials, as foam blowing additives, as finishing additives for dry cleaning, as a leveling additive for pen ink, as thickening/oil barrier additives for grease coatings and grease/PTFE lubricants, and as leveling or wetting additives for green house film.

The above applications are not meant to be limiting but only exemplary. The following section provides working examples that describe in particular and by way of illustration the present invention. These working examples are provided as illustrative and are not to be deemed to be limiting on the invention.

Glossary

AMPS—2-Acrylamido-2-methyl-1-propanesulfonic acid, available from Sigma-Aldrich, Milwaukee, Wis.

AOS—Sodium $C_{14-16}$ olefin sulfonate, available as Witconate AOS from Witco Corp., Houston, Tex.

BuFOSEA—N-butylperfluorooctylsulfonylethyl acrylate, $C_8F_{17}SO_2N(C_4H_9)CH_2CH_2OC(=O)CH=CH_2$, available as FC-189 from 3M, St. Paul, Minn.

Carbowax™ 350—$HO(CH_2CH_2O)_{7.5}CH_3$, available from Union Carbide, Danbury, Conn.

CW750 Acrylate—Carbowax™ 750 Acrylate, $CH_3O(CH_2CH_2O)_{17}C(=O)CH=CH_2$, prepared as in Example 17 of U.S. Pat. No. 3,728,151.

C-4DMAP—$C_4F_9SO_2N(CH_2CH_2CO_2^-)(CH_2)_3N^+H(CH_3)_2$ made essentially as described in column 7 of U.S. Pat. No. 5,468,352.

$C_4F_9SO_3K$—Potassium perfluorobutanesulfonate was prepared from PBSF as follows:
Equation:

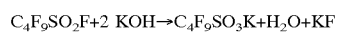

Charges:
200 g of 95% $C_4F_9SO_2F$ (PBSF), MW=302, 0.63 mole
83 g of 85% KOH, MW=56, 1.26 moles
400 ml water Procedure:
The charges were added into a one-liter flask fitted with an overhead stirrer, thermocouple, and reflux condenser, and then heated to reflux. The reflux temperature was initially 61° C. After 4.5 hours the internal temperature had risen to 74° C. without reflux being evident. Since the boiling point of PBSF is something like 60–65° C., it was presumed that it was all hydrolyzed. The batch was cooled to 15–18° C. and the pH measured and found to be 8–9. The batch was allowed to settle for 15 minutes and as much as possible the water phase was removed by vacuum decant with a poly fritted filter line assembly (70 microns) purchased from Sigma-Aldrich, Milwaukee, Wis. The batch was washed again with 300 ml of 14–18° C. water. The batch was allowed to settle for 15 min. and again vacuum decanted the same as before. Before decanting the pH of the liquid was measured and found to be 7–8. The batch was washed again with 300 ml of 14–18° C. water. The batch was allowed to settle for 15 min. and again vacuum decanted the same as before. After decanting, the batch was emptied into a glass dish and dried. After drying a total of 188 g was isolated ($^{188}/_{213}$=88% molar yield).

$C_4F_9SO_2N(CH_3)CH_2CO_2K$—This compound was made by the method described in Example 1 of U.S. Pat. No. 2,809,990 using methylamine, PBSF and the potassium salt of chloroacetic acid.

$C_6F_{13}SO_2N(CH_3)CH_2CO_2K$—This compound was prepared according to the same method as described above using perfluorohexane sulfonyl fluoride, methylamine and the potassium salt of chloroacetic acid.

Diglyme—2-Methoxyethyl ether, available from Sigma-Aldrich, Milwaukee, Wis.

DMAEMA—Dimethylaminoethyl methacrylate, available from Sigma-Aldrich, Milwaukee, Wis.

EtFOSEA—$C_8F_{17}SO_2N(C_2H_5)CH_2CH_2OC(=O)CH=CH_2$, available as FX-13 from 3M, St. Paul, Minn.

EtFOSEMA—$C_8F_{17}SO_2N(C_2H_5)CH_2CH_2OC(=O)C(CH_3)=CH_2$, available as FX-14 from 3M, St. Paul, Minn.

FC-95—$C_8F_{17}SO_3K$, available from 3M, St. Paul, Minn.

FC-129—$C_8F_{17}SO_2N(C_2H_5)CH_2CO_2^-K^+$, available from 3M, St. Paul, Minn.

FC-171—$C_8F_{17}SO_2N(C_2H_5)(CH_2CH_2O)_7CH_3$, available from 3M, St. Paul, Minn.

MeFBSEA—$C_4F_9SO_2N(CH_3)CH_2CH_2OC(=O)CH=CH_2$, prepared as described in Example 2 (Parts A and B) below.

MeFBSEMA—$C_4F_9SO_2N(CH_3)CH_2CH_2OC(=O)CH=CH_2$, prepared as described in Example 2 (Parts A and B) below, except using methacrylic acid instead of acrylic acid.

PBSF—Perfluoro-1-butanesulfonyl fluoride, available from Sigma-Aldrich, Milwaukee, Wis.

Pluronic™ Acrylate—
$HO(CH_2CH_2O)_{11}[CH(CH_3)CH_2O]_{21}(CH_2CH_2O)_{11}C(=O)CH=CH_2$, prepared as in Example 1 of U.S. Pat. No. 3,787,351.

StMA—Stearyl methacrylate, available from Sigma-Aldrich, Milwaukee, Wis.

Test Methods

Test Procedure I—Surface Tension Determination

All surface tensions were determined using a Kruss K12 Tensiometer. It was integrated with an automatic dosimat and a computer, using a software package for dynamic contact angle (K121). The program was run using a Wilhelmy platinum plate (PL12) and glass sample vessel (GL7). All parts referenced above including instrument and computer can be purchased directly from Kruss USA, 9305 Monroe Road, Suite B, Charlotte, N.C. 28270-1488 Phone: (704) 847-8933.

Test Procedure II—Contact Angle Measurement

Glass cover slips were rinsed with HPLC water and allow to air dry. The surfactant to be tested was mixed at 0.01 weight % with HPLC water. The pH was measured and if below 9, the pH was adjust to 9 by adding several drops of 1% $NH_4OH$. The surface tension of the surfactant solution was determined using Test Procedure I.

A clean, dry glass cover slip was placed in the clamp and lower to ~1 mm above the surface of the surfactant/water solution. Velocity search was set at 6 mm/min and velocity measure was set at 4 mm/min. Immersion depth was at least 10 mm, depending on the size of the cover slip. Advancing and receding contact angles were measured with 3 cycles. The cover slip was allowed to dry in the clamp, above the solution, for ten minutes. Advancing and receding contact angles were measured a second time with 3 cycles.

Test Procedure III—Wetting and Film Characterization on Glass Surface

A solution of the surfactant to be tested was prepared at 0.01% by weight in HPLC grade water. The surfactant solution pH was measured and if necessary, pH was adjusted to 9 by adding several drops of 1% $NH_4OH$. Glass plates were cleaned using Windex and a squeegee. Cleaned plates placed on top of 5.1 cm by 5.1 cm by 10.2 cm wood supports, which were laid out in a parallel arrangement. Two glass plates were used for each surfactant solution and laid out adjacent to each other. Surfactant solution (10 drops) was placed on each of the two plates and observed for solution hydrophilic or hydrophobic characteristics. The solution was considered hydrophilic if it was spread out and hydrophobic if it beaded up. The surfactant solutions were allowed to air dry and the resulting film on the glass plate observed for solution autophilic or autophobic properties. The solution was considered autophilic if it dried as a sheet and autophobic if it dried in separate puddles. After the surfactant solutions were dried on the plates the resulting films were observed for clarity and rated a 1 for high clarity, 2–3 for medium clarity, and 4–5 for low clarity. On one of the plates with the dried surfactant film was placed 10 drops of the same surfactant solution on top of the area with the dry film. Again the plate was observed for hydrophilic or hydrophobic characteristics. On the other plate was placed 10 drops of HPLC grade water on top of the area with the dry film, and hydrophilic or hydrophobic characteristics were observed.

EXAMPLES

In the following examples and comparative examples all %, weight %, and % by weight values are based on the total weight of the particular composition unless otherwise indicated.

Example 1

Preparation of $C_4F_9SO_2N(CH_3)(CH_2CH_2O)_{7.5}CH_3$

In this example the adduct of MeFBSA (N-methyl-perfluorobutanesulfonamide) and a polyoxyethylene monomethyl ether was prepared.

A. Preparation of MeFBSA (N-methyl-perfluorobutanesulfonamide)

Reaction:

$$C_4F_9SO_2F + 2NH_2CH_3 \rightarrow C_4F_9SO_2NHCH_3 + N^+H_3CH_3F^-.$$

Charges:
A. 200 g PBSF (perfluorobutanesulfonyl fluoride) distilled (est 95%, MW=302, 190 g active=0.63 mole).
B. 43 g $NH_2CH_3$ (MW=31, 1.38 moles)
C. 300 ml water (2 times)
D. 300 ml 3% $H_2SO_4$
E. 300 ml water (3 times)

Procedure:

1. In a 100 ml flask fitted with a −78° C. cold finger condenser, an overhead stirrer, thermocouple, and a plastic gas inlet tube, Charge A was added. The flask was placed in a water bath, and with stirring the gas addition (Charge B) was started.
2. After 10 minutes of gas addition, the temperature rose only 3° C. The internal temperature was raised by the addition of warm water to the bath to 50° C. and the gas addition rate was increased.
3. The internal temperature was kept at 53–45° C. and the addition of Charge B took approximately 40 minutes. The batch was allowed to stir at room temperature overnight and was still a liquid in the morning.
4. In the morning, the batch was heated to 50° C. with a heating mantle. Charge C was added slowly to maintain the temperature. The batch was agitated for 15 minutes then allowed to split. The upper water layer was removed by vacuum decant (sucking off the top phase with the aspirator). This operation was repeated with an additional 300 ml of water.
5. After washing 2× with water, the batch was washed with Charge D, split and vacuum decanted.
6. The acid washed fluorochemical (FC) bottom layer was washed 3× with 300 ml of water, split and vacuum decanted each time.
7. After the third wash the unused openings in the flask were stopped up, and a vacuum pump was attached to the flask. With stirring and at 45° C., the vacuum was slowly pulled on the flask to prevent spitting when residual water boils off too rapidly. The vacuum leveled off at 5 torr.
8. The batch was heated to 60° C. at 5 torr vacuum for 30 min then at 85° C. for 15 min. The batch was cooled to 45° C. and vacuum was broken.
9. The yellow liquid was poured out into a crystallizing dish and weighed. 181 g of material was isolated (theoretical=197 g, yield=181/197=92%). A thermocouple was inserted into the liquid. The liquid crystallized at 37° C. into a pale yellow solid.

B. Alkylation of MeFBSA (N-methyl-perfluorobutanesulfonamide) with CARBOWAX™ Chloride Reaction:

$$C_4F_9SO_2N(CH_3)H + KOH + Cl(CH_2CH_2O)_{7.5}CH_3 \rightarrow$$
$$C_4F_9SO_2N(CH_3)(CH_2CH_2O)_{7.5}CH_3 + KCl + H_2O$$

Charges:
A. 50.7 g MeFBSA (0.162 moles)
B. 24.1 g potassium carbonate (0.1749 moles)
C. 63.7 g CARBOWAX™ chloride (MW=374.5, 0.170 g/mole) Carbowax™ chloride was prepared as follows. To Carbowax™ 350 (44 g) ($HO(CH_2CH_2O)_{7.5}CH_3$) and super-cel (0.4 grams) was added slowly thionyl chloride (18 grams) at 70° C. with stirring. After addition, the stirring was continued for another hour at 70–75° C. The excess thionyl chloride and the by-products ($SO_2$ and HCl) were then removed under vacuum with nitrogen gas bubbled in. The product, Carbowax™ chloride, $Cl(CH_2CH_2O)_{7.5}CH_3$, was then analyzed by FTIR for the unreacted OH group (usually <0.5%).

D. 5 g diglyme
E. 200 ml water
F. 60 ml 2% NaCl

Procedure:

1. Charges A, B, C and D were placed in a 1000 ml flask fitted with an overhead stirrer and a thermocouple, and heated with stirring at 120° C. overnight.
2. In the morning the batch was cooled to 40–50° C. and Charge E was added. The batch was stirred for 15 minutes and split.
3. The lower fluorochemical layer was washed with Charge F and split off.
4. The fluorochemical layer was hazy so it was filtered through a piece of filter paper into a weighed jar. A total of 83 g was isolated.

Example 2

Preparation of MeFBSEA (62%)/CW750 Acrylate (19%)/AMPS (19%)

In this example a random copolymer of MeFBSEA with CW750 Acrylate and AMPS was prepared.

A. Ethoxylation of MeFBSA with Ethylene Carbonate

Reaction:

$$C_4F_9SO_2NHCH_3 + (CH_2O)_2C=O + Na_2CO_3(cat) \rightarrow$$
$$C_4F_9SO_2N(CH_3)CH_2OH + CO_2$$

Charges:
A. 100 g MeFBSA (MW=313, 0.32 moles)
B. 2.8 g $Na_2CO_3$ (0.026 moles)
D1. 8 g ethylene carbonate (MW=88) melted in oven at 50° C.
D2. 8 g ethylene carbonate
D3. 8 g ethylene carbonate
D4. 10 g ethylene carbonate (total weight=34 g, 0.38 moles)
E. 300 ml water F. 300 ml water G. 300 ml 3 wt % sulfuric acid H. 300 ml water I. 300 ml water J. 300 ml water Procedure:

1. Charges A, B, and C were placed in a one liter 3-necked flask with an overhead stirrer, thermocouple, addition funnel, and reflux condenser.
2. The batch was heated to 60° C. (140° F.) at which point the batch was molten and the stirring was begun. The setpoint was increased to 120° C. (248° F.).
3. When the batch reached 120° C., Charge D1 was removed from the oven and transferred to the addition funnel. Charge D1 was then added slowly over a period of 10 minutes. Outgasing (carbon dioxide) was observed. Thirty minutes elapsed until the rate of outgasing was noticed to have diminished.
4. Charge D2 was then transferred to the addition funnel and added over a period of 5 minutes. After 25 minutes, the rate of outgasing had slowed and Charge D3 was added over a 5 minute period. After 30 minutes, Charge D4 was removed from the oven, added to the addition funnel and added to the batch over a 5 minute period.
5. The setpoint was reduced to 110° C. (230° F.) and allowed to stir overnight.
6. In the morning, the batch was cooled to 90° C. (194° F.) and the batch was sampled. GC analysis showed the material to be 96.1% desired product and to contain no amide. Charge E was added. The batch was stirred for 30 minutes, allowed to split and the upper water phase was vacuum decanted off. The operation was repeated for Charge F at 63° C. (145° F.).
7. After the water washes, the batch was agitated with Charge G for 30 minutes at 63° C. (145° F.), then was phase split, and vacuum decanted. The pH of the water layer was tested and found to be less than 2.
8. After the acid wash, the batch was washed with water charges H, I, and J successively at 63° C. (145° F.).
9. The batch was melted out of the flask into a bottle and allowed to solidify. A small amount of water on top of the solid was poured off, and the material in the jar was found to weigh 124 g.
10. The material was melted into a two-necked 500 ml flask. The melting point was found to be 57° C. (135° F.).
11. The material (113 g) was distilled at 5–7 torr Hg. 104 g (92% of undistilled material) distilled at a head temperature of 130–137° C. (266–279° F.) and a pot temperature of 136–152° C. (277–306° F.). Further increase of the pot temperature to 170° C. (338° F.) resulted in no further material distilling over.

B. Preparation of MeFBSEA (N-methyl-perfluorobutanesulfonylethyl acrylate)

Reaction:

$C_4F_9SO_2N(CH_3)CH_2CH_2OH + CH_2=CHCO_2H + \text{triflic acid} (CF_3SO_3H) \text{ catalyst} \rightarrow C_4F_9SO_2N(CH_3)CH_2CH_2OC(=O)CH=CH_2 + H_2O + CF_3SO_3H$ Charges:

A. 112 g MeFBSE alcohol ($C_4F_9SO_2N(CH_3)CH_2CH_2OH$, 0.313 moles)

B. 0.07 g phenothiazine

C. 0.11 MEHQ (methoxyhydroquinone)

D. 100 g Heptane

E. 27.5 g acrylic acid (0.38 moles)

F. 1 g anhydrous triflic acid

G. 300 g water

H. 300 g water

Procedure:

1. Charges A, B, C, D, E and F were added to a 3-necked flask equipped with decanter assembly, overhead stirrer, and a thermocouple under positive nitrogen pressure.
2. The flask was warmed to 60° C. and the stirring was begun. The batch was stirred at reflux which was initially at 96° C. and rose to 102° C. by the end of the reaction. The theoretical water that should be collected in the decanter was 6.3 ml. After 15 minutes of refluxing, 2 ml had collected. After 1 hour and 15 minutes, the reflux temperature was 99° C. and 5 ml had collected. After 5 hours and 15 minutes the reflux temperature was 102° C. and 5.4 ml was collected. A sample was withdrawn and GC analysis showed no unreacted alcohol, 92.6% desired product and 7.4% high boiler that is probably the Michael adduct with acrylic acid.
3. The batch was stripped atmospherically to the decanter until at 103° C. no more heptane collected there.
4. The batch was cooled to 64° C. and vacuum was slowly pulled. More heptane was stripped off until at 5 torr no more liquid was observed to be distilling off.
5. Vacuum was broken and Charge G was added. The batch was stirred at 64° C. for 15 minutes and the top layer was sucked off.
6. This operation was repeated with Charge H, then the batch was allowed to cool to room temperature at which point the product was a solid. The remaining water was poured off and the material was melted out of the container into a jar. The weight of the product was 125 g (theoretical 129 g). GC analysis showed the material to be 92.64% desired acrylate and 7.36% acrylic acid Michael adduct.

C. Preparation of Random Acrylic Copolymer of MeFBSEA (62%) with CW750 Acrylate (19%) and AMPS Monomer (2-Acrylamido-2-methylpropanesulfonic acid) (19%)

Charges:

12.4 g MeFBSEA 3.8 g CW750 Acrylate 3.8 g AMPS monomer 1.0 g t-butyl peroctoate (100% solids)

1.0 g 3-mercapto-1,2-propanediol 109 g IPA (isopropyl alcohol)

The charges above were added to a 500 ml flask under positive nitrogen pressure. The batch was heated to 79° C. for 8 hours. Concentrated ammonium hydroxide (6.5 g) in 100 ml of water was added to the batch and it was stirred for 30 minutes at room temperature. The batch was stripped at reduced pressure. A total of 128 g of water solution was isolated, which when solids were measured was found to contain 14.3% (by weight of the solution) copolymer.

Example 3

Preparation of MeFBSEA (35%)/CW750 Acrylate (65%)

In the example, the random acrylic copolymer of MeFBSEA with CW750 Acrylate was prepared.

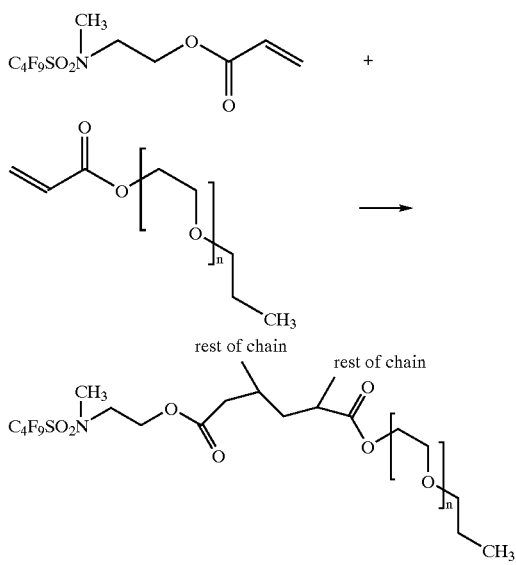

Charges:
- 350 g MeFBSEA (Example 2)
- 650 g CW750A
- 40 g t-butyl peroctoate (50% solids)
- 5 g mercaptopropionic acid
- 1000 g ethyl acetate The charges above were added to a 500 ml flask under positive nitrogen pressure. The batch was heated to 79° C. for 6 hours. A total of 2021 g of polymer solution was isolated which when solids were measured was found to be 48.6% of desired product.

Example 4

Preparation of MeEBSEA (22.8%)/Pluronic™ Acrylate (77.2%)

In this example the random copolymer of MeFBSEA and Pluronic™ acrylate was prepared.

Charges:
- 116 g MeFBSEA (Example 2)
- 784 g PLURONIC™ acrylate (50% solution in toluene)
- 14 g 2,2'-azobisisobutyronitrile
- 28 g 3-mercapto-1,2-propanediol
- 750 g toluene The charges above were added to a 5000 ml flask under positive nitrogen pressure. The batch was heated to 79° C. for 5.5 hours. The batch was stripped at 12–15 torr until the batch temperature reached 52° C. at which time little or no more solvent was observed to strip off. The batch was poured into jars and weighed and a total of 726 g of polymer was isolated.

Example 5

Preparation of MeFBSEA (30%)/CW750 Acrylate (65%)/AMPS (5%)

In this example a random acrylic copolymer of MeFBSEA (30 weight %) with CW750 acrylate (65 weight %) and AMPS monomer was prepared. The following charges were added to a 500 ml flask under positive nitrogen pressure:

Charges:
- 15 g MeFBSEA
- 32.5 g CW750A
- 2.5 g AMPS monomer
- 2.5 g 2,2'-Azobisisobutyronitrile
- 2.0 g 3-mercapto-1,2-propanediol
- 117 g N-methylpyrrolidinone
- 2.8 g N-Methyldiethanolamine The batch was heated to 79° C. for 5 hours. The solids content was found to be 27.1% by weight of the resulting polymer solution by evaporation of a small quantity. Analysis of the polymer solution for residual monomer was done using a flame ionization GC, using N,N-Diethyl-m-Toluamide as an internal standard in N,N-Dimethylacetamide, and obtaining calibration curves with the MeFBSEA and the internal standard. Weight % residual MeFBSEA was found to be 0.0201%.

Example 6

Preparation of MeFBSEA (30%)/Pluronic™ Acrylate (70%)

Two lots of a surfactant were prepared essentially as in Example 4 using MeFBSEA and Pluronic™ acrylate in a weight ratio of 30:70.

Example 7

Preparation of MeFBSEA (62%)/CW750 Acrylate (18%)/AMPS Potassium Salt (20%)

A surfactant was prepared essentially as in Example 2, using AMPS potassium salt in place of AMPS, and using MeFBSEA, CW750, and AMPS potassium salt in a weight ratio of 62:18:20.

Example 8

Preparation of MeFBSEA (70%)/CW750 Acrylate (10%)/AMPS Potassium Salt (20%)

A surfactant was prepared essentially as in Example 2, using AMPS potassium salt in place of AMPS, and using MeFBSEA, CW750, and AMPS potassium salt in a weight ratio of 70:10:20.

Example 9

Preparation of MeFBSEA (30%)/CW750 Acrylate (70%)

A surfactant was prepared essentially as in Example 2, without AMPS, and using MeFBSEA, and CW750 in a weight ratio of 30:70.

Example 10

Preparation of Mixed Surfactant $C_4F_9SO_2N(CH_3)(CH_2CH_2O)_{7.5}CH_3$ with MeFBSEA (30%)/CW750 Acrylate (70%)

A mixed surfactant was prepared by mixing the copolymer surfactant of Example 9 with the surfactant of Example 1 and ethyl acetate in a weight ratio of 30:40:30.

Example 11

Preparation of MeFBSEMA (30%)/CW750 Acrylate (70%)

In this example a random copolymer surfactant of MeFBSEMA with CW750 acrylate was prepared. The following charges were added to a 1000 ml flask under positive nitrogen pressure:

30 g MeFBSEMA
70 g CW750 Acrylate
6 g t-butyl peroctoate (50% solids in mineral spirits)
3 g mercaptopropanediol
100 g ethyl acetate The batch was heated to 79° C. for 6 hours. The solids content was found to be 46.7% by weight of the resulting polymer solution by evaporation of a small quantity.

Example 12

Preparation of Catanionic Polymer of MeFBSEA (40%)/CW750 Acrylate (50%)/AMPS (10%) with MeFBSEA (40%)/CW750 Acrylate (53%)/DMAEMA (7%)

An acidic random copolymer surfactant of MeFBSEA with CW750 acrylate and AMPS was first prepared. The following charges were added to a 1000 ml flask under positive nitrogen pressure:

40 g MeFBSEA
50 g CW750 Acrylate
10 g AMPS
8 g t-butyl peroctoate (50% solids in mineral spirits)
3 g mercaptopropanediol
233 g 1-methyl-2-pyrrolidinone The batch was heated to 90° C. for 6 hours. The solids content was found to be 30.1% by weight of the resulting polymer solution by evaporation of a small quantity.

A basic random copolymer surfactant of MeFBSEA with CW750 acrylate and DMAEMA was then prepared. The following charges were added to a 1000 ml flask under positive nitrogen pressure:

40 g MeFBSEA
53 g CW750 Acrylate
7 g dimethylaminoethyl methacrylate (DMAEMA)
8 g t-butyl peroctoate (50% solids in mineral spirits)
3 g mercaptopropanediol
233 g 1-methyl-2-pyrrolidinone The batch was heated to 90° C. for 6 hours. The solids content was found to be 30.9% by weight of the resulting polymer solution by evaporation of a small quantity.

The catanionic polymer surfactant solution was made by mixing 100 ml of the acidic polymer surfactant solution with 100 ml of the basic polymer surfactant solution. The pH was measured and found to be 2 to 3, and the solids content was found to be 30.6%.

Example 13

Preparation of MeFBSEA (30%)/CW750 Acrylate (23%)/Stearyl Methacrylate (30%)/AMPS (10%)/DMAEMA (7%)

In this example a random copolymer surfactant of MeFBSEA with CW750 acrylate, stearyl methacrylate, AMPS, and DMAEMA was prepared. The following charges were added to a 1000 ml flask under positive nitrogen pressure:

30 g MeFBSEA
23 g CW750 Acrylate
10 g AMPS
30 g stearyl methacrylate
7 g dimethylaminoethyl methacrylate
8 g t-butyl peroctoate (50% solids in mineral spirits)
3 g mercaptopropanediol
233 g 1-methyl-2-pyrrolidinone The batch was heated to 90° C. for 6 hours. The solids content was found to be 30.1% by weight of the resulting polymer solution by evaporation of a small quantity.

Example 14

Preparation of MeFBSEA (30%)/CW750 Acrylate (70%)

In this example a random copolymer surfactant of MeFBSEA with CW750 acrylate was prepared. The following charges were added to a 1000 ml flask under positive nitrogen pressure:

30 g MeFBSEA
70 g CW750 Acrylate
8 g t-butyl peroctoate (50% solids in mineral spirits)
1 g mercaptopropanediol
100 g ethyl acetate The batch was heated to 79° C. for 6 hours. The solids content was found to be 46.7% by weight of the resulting polymer solution by evaporation of a small quantity.

Example 15

Preparation of MeFBSEMA (56%)/CW750 Acrylate (33%)/AMPS (11%)

In this example a random copolymer surfactant of MeFBSEMA with CW750 acrylate, and AMPS was prepared. The following charges were added to a 1000 ml flask under positive nitrogen pressure:

55 g MeFBSEMA
33 g CW750 Acrylate
11 g AMPS
8 g t-butyl peroctoate (50% solids in mineral spirits)
3 g mercaptopropanediol
233 g 1-methyl-2-pyrrolidinone The batch was heated to 90° C. for 6 hours. The solids content was found to be 30.1% by weight of the resulting polymer solution by evaporation of a small quantity.

Example 16

Preparation of MeEBSEMA (55%)/CW750 Acrylate (35%)/Acrylic Acid (10%)

In this example a random copolymer surfactant of MeFBSEMA with CW750 acrylate, and acrylic acid was prepared. The following charges were added to a 1000 ml flask under positive nitrogen pressure:

55 g MeFBSEMA
35 g CW750 Acrylate
10 g acrylic acid
6 g t-butyl peroctoate (50% solids in mineral spirits)
1 g mercaptopropanediol
100 g ethyl acetate The batch was heated to 79° C. for 8 hours. The solids content was found to be 48.1% by weight of the resulting polymer solution by evaporation of a small quantity.

Example 17

Preparation of MeFBSEA (50%)/CW750 Acrylate (50%)

In this example a random copolymer surfactant of MeFBSEA with CW750 acrylate was prepared. The following charges were added to a 1000 ml flask under positive nitrogen pressure:
50 g MeFBSEA
50 g CW750 Acrylate
6 g t-butyl peroctoate (50% solids in mineral spirits)
1 g mercaptopropanediol
100 g ethyl acetate The batch was heated to 79° C. for 8 hours. The solids content was found to be 48.1% by weight of the resulting polymer solution by evaporation of a small quantity.

Example 18

Preparation of MeFBSEMA (50%)/CW750 Acrylate (50%)

In this example a random copolymer surfactant of MeFBSEA with CW750 acrylate was prepared. The following charges were added to a 1000 ml flask under positive nitrogen pressure:
50 g MeFBSEMA
50 g CW750 Acrylate
6 g t-butyl peroctoate (50% solids in mineral spirits)
1 g mercaptopropanediol
100 g ethyl acetate The batch was heated to 79° C. for 8 hours. The solids content was found to be 48.1% by weight of the resulting polymer solution by evaporation of a small quantity.

Example 19

Preparation of MeFBSEA (50%)/CW750 Acrylate (54%)/Acrylic Acid (2%)/DMAEMA (4%)

In this example a random copolymer surfactant of MeFBSEA with CW750 acrylate, acrylic acid, and DMAEMA was prepared. The following charges were added to a 1000 mil flask under positive nitrogen pressure:
40 g MeFBSEA
54 g CW750 Acrylate
2 g acrylic acid
4 g DMAEMA
8 g t-butyl peroctoate (50% solids in mineral spirits)
3 g mercaptopropanediol
100 g ethyl acetate The batch was heated to 79° C. for 8 hours. The solids content was found to be 48.1% by weight of the resulting polymer solution by evaporation of a small quantity.

Example 20

Preparation of MeFBSEA (40%)/CW750 Acrylate (49%)/Acrylic Acid (4%)/DMAEMA (8%)

In this example a random copolymer surfactant of MeFBSEA with CW750 acrylate, acrylic acid, and DMAEMA was prepared. The following charges were added to a 1000 ml flask under positive nitrogen pressure:
40 g MeFBSEA
49 g CW750 Acrylate
4 g acrylic acid
8 g DMAEMA
6 g t-butyl peroctoate (50% solids in mineral spirits)
1 g mercaptopropanediol
100 g ethyl acetate The batch was heated to 79° C. for 8 hours. The solids content was found to be 48.1% by weight of the resulting polymer solution by evaporation of a small quantity.

Example 21

Preparation of MeFBSEA (55%)/CW750 Acrylate (35%)/Acrylic Acid (10%)

In this example a random copolymer surfactant of MeFBSEA with CW750 acrylate, and acrylic acid was prepared. The following charges were added to a 1000 ml flask under positive nitrogen pressure:
55 g MeFBSEA
35 g CW750 Acrylate
10 g acrylic acid
6 g t-butyl peroctoate (50% solids in mineral spirits)
1 g mercaptopropanediol
100 g ethyl acetate The batch was heated to 79° C. for 8 hours. The solids content was found to be 48.1% by weight of the resulting polymer solution by evaporation of a small quantity.

Example 22

Scaled-Up Preparation of MeFBSEA (55%)/CW750 Acrylate (35%)/Acrylic Acid (10%)

Example 21 was essentially repeated except that all components were increased in amount 5 fold, and a 3000 ml flask was used. The solids content was found to be 53% by weight of the resulting polymer solution by evaporation of a small quantity.

Example 23

Large Batch Preparation of MeFBSEA (55%)/CW750 Acrylate (35%)/Acrylic Acid (10%)

Example 21 was essentially repeated except that all components were increased in amount 10 fold, and a 3000 ml flask was used. The solids content was found to be 52% by weight of the resulting polymer solution by evaporation of a small quantity.

Example 24

Preparation of MeFBSEMA (53%)/Stearyl Methacrylate (33%)/Acrylic Acid (14%)

In this example a random copolymer surfactant of MeFBSEMA with steryl methacrylate was prepared. The following charges were added to a 1000 ml flask under positive nitrogen pressure:
55 g MeFBSEMA
35 g stearyl methacrylate 15 g acrylic acid 6 g t-butyl peroctoate (50% solids in mineral spirits)

3 g mercaptopropanediol 100 g ethyl acetate

The batch was heated to 79° C. for 6 hours. The solids content was found to be 46.7% by weight of the resulting polymer solution by evaporation of a small quantity.

Example 25

Preparation of Partially Neutralized MeFBSEA (40%)/CW750 Acrylate (50%)/AMPS (10%)

In this example a random copolymer surfactant of MeFBSEA with CW750 acrylate, and AMPS was prepared and partially neutralized with $C_4F_9SO_2N(CH_2CH_2CO_2^-)(CH_2)_3N^+H(CH_3)_2$ (C-4DMAP). The following charges were added to a 1000 ml flask under positive nitrogen pressure:

40 g MeFBSEA 50 g CW750 Acrylate 10 g AMPS 8 g t-butyl peroctoate (50% solids in mineral spirits)

3 g mercaptopropanediol 233 g 1-methyl-2-pyrrolidinone

The batch was heated to 90° C. for 5 hours. The solids content was found to be 30.1% by weight of the resulting polymer solution by evaporation of a small quantity. The C-4DMAP amide was then added to the resulting polymer solution.

Example 26

Preparation of MeFBSEA (40%)/CW750 Acrylate (51%)/AMPS (5%)/DMAEMA (4%)

In this example a random copolymer surfactant of MeFBSEA with CW750 acrylate, AMPS, and DMAEMA was prepared. The following charges were added to a 1000 ml flask under positive nitrogen pressure:

40 g MeFBSEA 51 g CW750 Acrylate 5 g AMPS 4 g DMAEMA 8 g t-butyl peroctoate (50% solids in mineral spirits)

3 g mercaptopropanediol 233 g 1-methyl-2-pyrrolidinone

The batch was heated to 90° C. for 5 hours. The solids content was found to be 28% by weight of the resulting polymer solution by evaporation of a small quantity.

Example 27

Preparation of MeFBSEMA (40%)/CW750 Acrylate (51%)/AMPS (5%)/DMAEMA (4%)

In this example a random copolymer surfactant of MeFBSEMA with CW750 acrylate, AMPS, and DMAEMA was prepared. The following charges were added to a 1000 ml flask under positive nitrogen pressure:

40 g MeFBSEMA 51 g CW750 Acrylate 5 g AMPS 4 g DMAEMA 8 g t-butyl peroctoate (50% solids in mineral spirits)

3 g mercaptopropanediol 233 g 1-methyl-2-pyrrolidinone

The batch was heated to 90° C. for 6 hours. The solids content was found to be 30.3% by weight of the resulting polymer solution by evaporation of a small quantity.

Example 28

Preparation of Catanionic Polymer of MeFBSEA (30%)/CW750 Acrylate (65%)/AMPS (10%) with MeFBSEMA (55%)/CW750 Acrylate (37%)/DMAEMA (8%)

An acidic random copolymer surfactant of MeFBSEA with CW750 acrylate and AMPS was first prepared. The following charges were added to a 1000 ml flask under positive nitrogen pressure:

30 g MeFBSEA 65 g CW750 Acrylate 10 g AMPS 8 g t-butyl peroctoate (50% solids in mineral spirits)

3 g mercaptopropanediol 233 g 1-methyl-2-pyrrolidinone

The batch was heated to 90° C. for 6 hours. The solids content was found to be 30.1% by weight of the resulting polymer solution by evaporation of a small quantity.

A basic random copolymer surfactant of MeFBSEMA with CW750 acrylate and DMAEMA was then prepared. The following charges were added to a 1000 ml flask under positive nitrogen pressure:

55 g MeFBSEMA 37 g CW750 Acrylate 8 g dimethylaminoethyl methacrylate (DMAEMA)

8 g t-butyl peroctoate (50% solids in mineral spirits)

3 g mercaptopropanediol 233 g 1-methyl-2-pyrrolidinone

The batch was heated to 90° C. for 6 hours. The solids content was found to be 30.9% by weight of the resulting polymer solution by evaporation of a small quantity.

The catanionic polymer surfactant solution was made by mixing 100 ml of the acidic polymer surfactant solution with 100 ml of the basic polymer surfactant solution. The pH was measured and found to be 2 to 3, and the solids content was found to be 30.6%.

Comparative Example C1

Surface Tension of Water Containing $C_8F_{17}SO_3^-K^+$ (FC-95) and $C_4F_9SO_3^-K^+$ Surface tensions of $C_8F_{17}SO_3^-K^+$(FC-95) and $C_4F_9SO_3^-K^+$ were measured in water according to the Test Procedure I. The results are shown in Table 1 and plotted as a function of surfactant concentration (ppm) in FIG. 1.

TABLE 1

Surface Tensions (dynes/cm) of Sulfonate Surfactants at Various Concentrations in Water.

| Ionic Surfactant | Surface Tension (dynes/cm) at Various Surfactant Concentrations | | | |
|---|---|---|---|---|
| | 0 ppm | 10 ppm | 100 ppm | 1000 ppm |
| $C_8F_{17}SO_3K$ | 72 | 67.7 | 54.1 | 33.1 |
| $C_4F_9SO_3K$ | 72 | 70 | 67.5 | 53 |

The results in Table 1 demonstrated the expected superior surface tension reducing properties of $C_8F_{17}$ surfactant sulfonate salts over the corresponding $C_4F_9$ surfactant sulfonate salts.

Comparative Example C2

Figure 2:
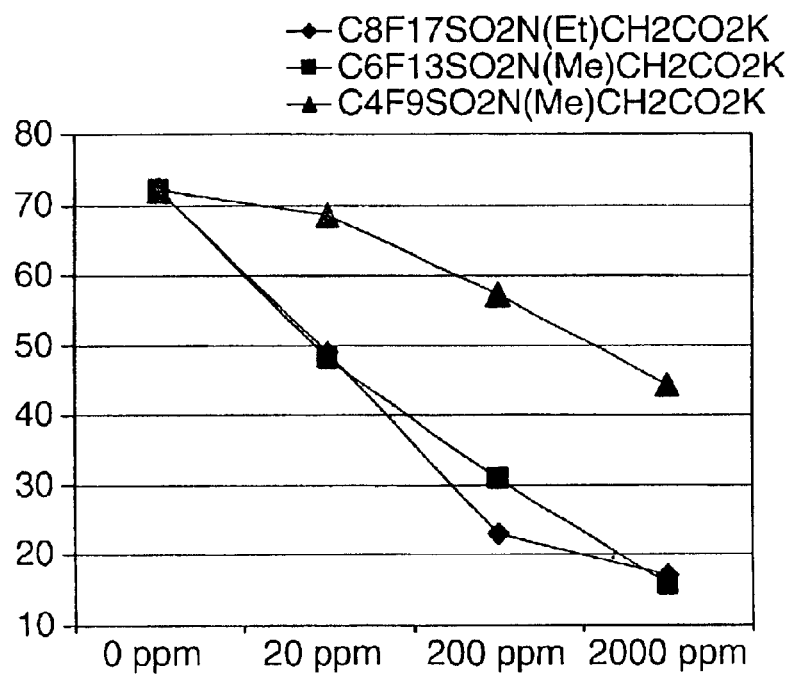
FIG. 2 is a graphic comparison of surface tensions in water of $C_8$, $C_6$ and $C_4$ perfluoroglycamides.

Surface Tension of Water Containing $C_8F_{17}SO_2N(Et)CH_2CO_2^-K^+$, $C_6F_{13}SO_2N(Me)CH_2CO_2^-K^+$ and $C_4F_9SO_2N(Me)CH_2CO_2^-K^+$ Surface tensions of $C_8F_{17}SO_2N(Et)CH_2CO_2^-K^+$, $C_6F_{13}SO_2N(Me)CH_2CO_2^-K^+$ and $C_4F_9SO_2N(Me)CH_2CO_2^-K^+$ were measured in water according to Test Procedure I. The results are shown in Table 2 and plotted as a function of surfactant concentration (ppm) in FIG. 2.

TABLE 2

Surface Tensions (dynes/cm) of Perfluoroglycamide Surfactants at Various Concentrations in Water

| Perfluoroglycamide Surfactant | Surface Tension (dynes/cm) at Various Surfactant Concentrations | | |
|---|---|---|---|
| | 20 ppm | 200 ppm | 2000 ppm |
| $C_8F_{17}SO_2N(Et)CH2CO2K$ | 49 | 23 | 17 |
| $C_6F_{13}SO_2N(Et)CH2CO2K$ | 48.2 | 30.8 | 15.5 |
| $C_4F_9SO_2N(Et)CH2CO2K$ | 68.5 | 57.4 | 44.4 |

The results in Table 2 demonstrated the expected superior surface tension reducing properties of $C_8F_{17}$ surfactants carboxylate salts over the corresponding $C_4F_9$ surfactant carboxylate salts.

Comparative Example C3

Surface Tension of Water Containing BuFOSEA (30 weight %)/PLURONIC™ Acrylate (70%)

Figure 3:
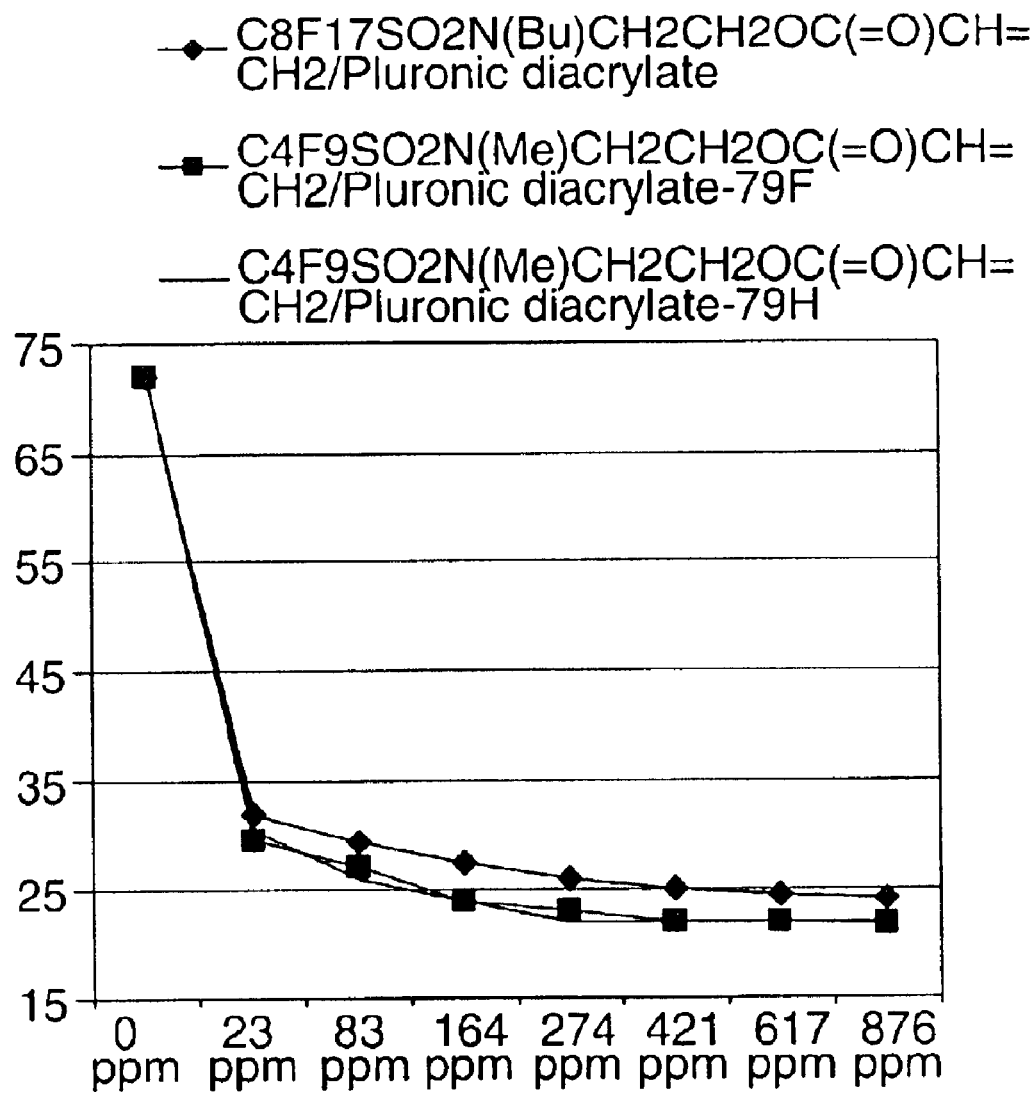
FIG. 3 is a graphic comparison of surface tensions in water of a $C_8F_{17}$ copolymeric surfactant and a $C_4F_9$ copolymeric surfactant.

The surface tension in water of a surfactant prepared as in Example 4, but with BuFOSEA ($C_8F_{17}SO_2N(C_4H_9)CH_2CH_2OC(=O)CH=CH_2$) (30 weight %) and the PLURONIC™ acrylate (70 weight %) was measured according to Test Procedure I. The results are shown in Table 3 and plotted as a function of surfactant concentration (ppm) in FIG. 3.

Example 29

Surface Tension of Water Containing (MeFBSEA (30%)/PLURONIC™ Acrylate (70%)

The surface tensions in water of two lots of the Example 6 surfactant (MeFBSEA ($C_4F_9SO_2N(CH_3)CH_2CH_2OC(=O)CH=CH_2$) (30 weight %) and PLURONIC™ acrylate ($HO(CH_2CH_2O)_{11}[CH(CH_3)CH_2O]_{21}(CH_2CH_2O)_{11}C(=O)CH=CH_2$) (70 weight %)) were measured according to Test Procedure I. The results are shown in Table 3 and plotted in FIG. 3, which shows that in this case the $C_4F_9$ copolymer surfactant, surprisingly, has a lower surface tension than the corresponding $C_8F_{17}$ analog.

Comparative Example C4

Surface Tension of Water Containing BuFOSEA (62%)/CW750 Acrylate (18%)/AMPS Potassium Salt (20%)

Figure 4:
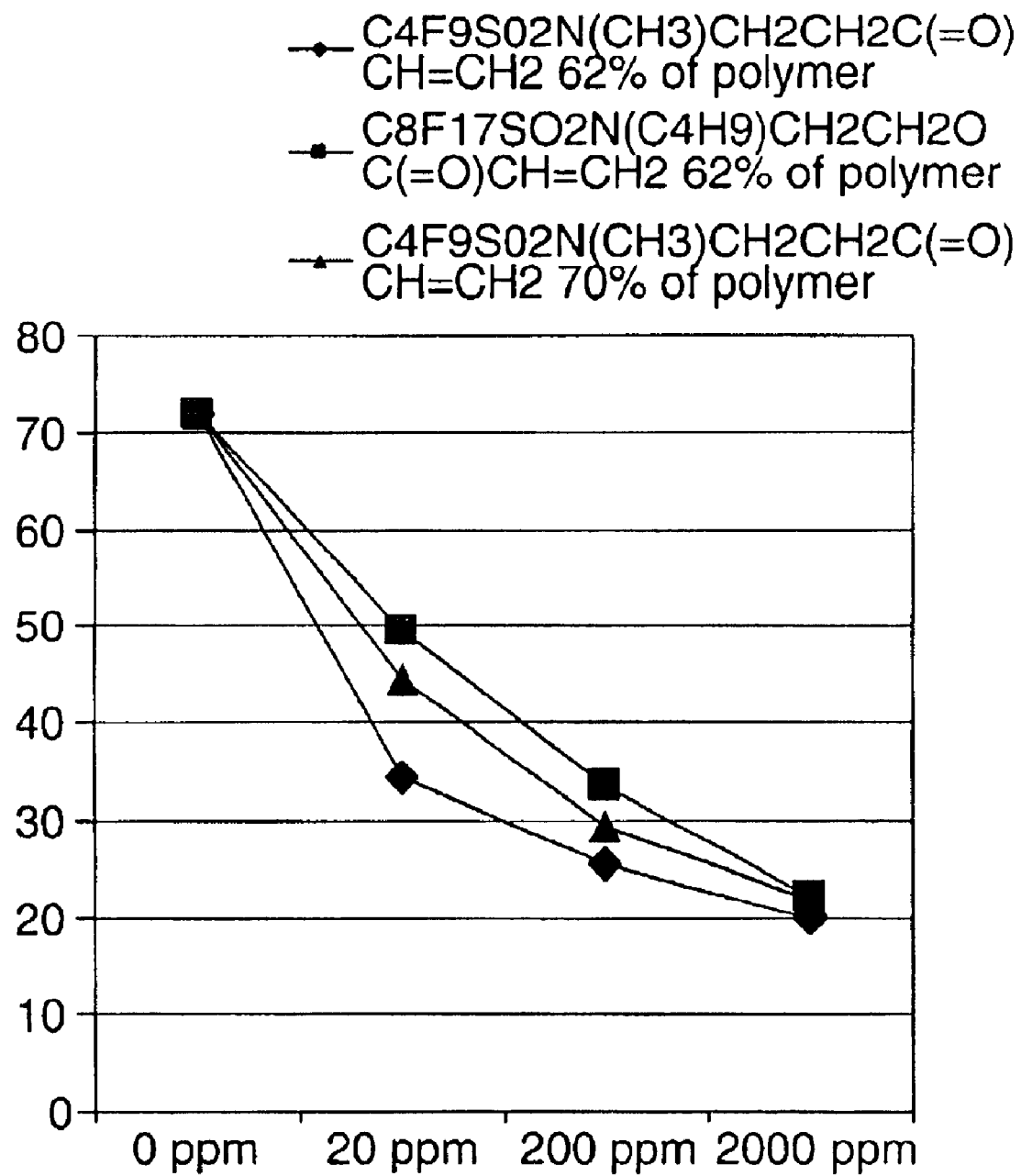
FIG. 4 is a graphic comparison of surface tensions in water of $C_4F_9$ copolymer and $C_8F_{17}$ copolymer surface-active agents.

The surface tension in water of a surfactant prepared as described in the Surfactant 5 example in U.S. Pat. No. 5,612,431 with BuFOSEA ($C_8F_{17}SO_2N(C_4H_9)CH_2CH_2OC(=O)CH=CH_2$) (62 weight %) CW 750 Acrylate (18% by weight) and AMPS potassium salt (20% by weight) was measured according to Test Procedure I. The results are shown in Table 3 and plotted as a function of concentration (ppm) in FIG. 4.

Example 30

Surface Tension of Water Containing MeFBSEA (62%)/CW750 Acrylate (18%)/AMPS Potassium Salt (20%)

The surface tension in water of the surfactant of Example 7 (MeFBSEA ($C_4F_9SO_2N(CH_3)CH_2CH_2OC(=O)CH=CH_2$) (62% by weight), CW 750 Acrylate (18% by weight), and AMPS potassium salt (20% by weight)) was measured according to Test Procedure I. The results, shown in Table 3, are plotted as a function of concentration in FIG. 4, and show that in this case the $C_4F_9$ copolymer surfactant, surprisingly, has a lower surface tension than the corresponding $C_8F_{17}$ analog.

Example 31

Surface Tension of Water Containing MeFBSEA (70%)/CW 750 Acrylate (10%)/AMPS Potassium Salt (20%)

The surface tension in water of the surfactant of Example 8 (MeFBSEA ($C_4F_9SO_2N(CH_3)CH_2CH_2OC(=O)CH=CH_2$) (70% by weight), CW 750 Acrylate (10% by weight), and AMPS potassium salt (20% by weight)) was measured according to Test Procedure I. The results, shown in Table 3, are plotted as a function of concentration in FIG. 4, and show again that in this case the $C_4F_9$ copolymer surfactant, surprisingly, has a lower surface tension than the corresponding $C_8F_{17}$ analog.

Comparative Example C5

Surface Tension of Water Containing $C_8F_{17}SO_2N(Et)(CH_2CH_2O)_7CH_3$

Figure 5:
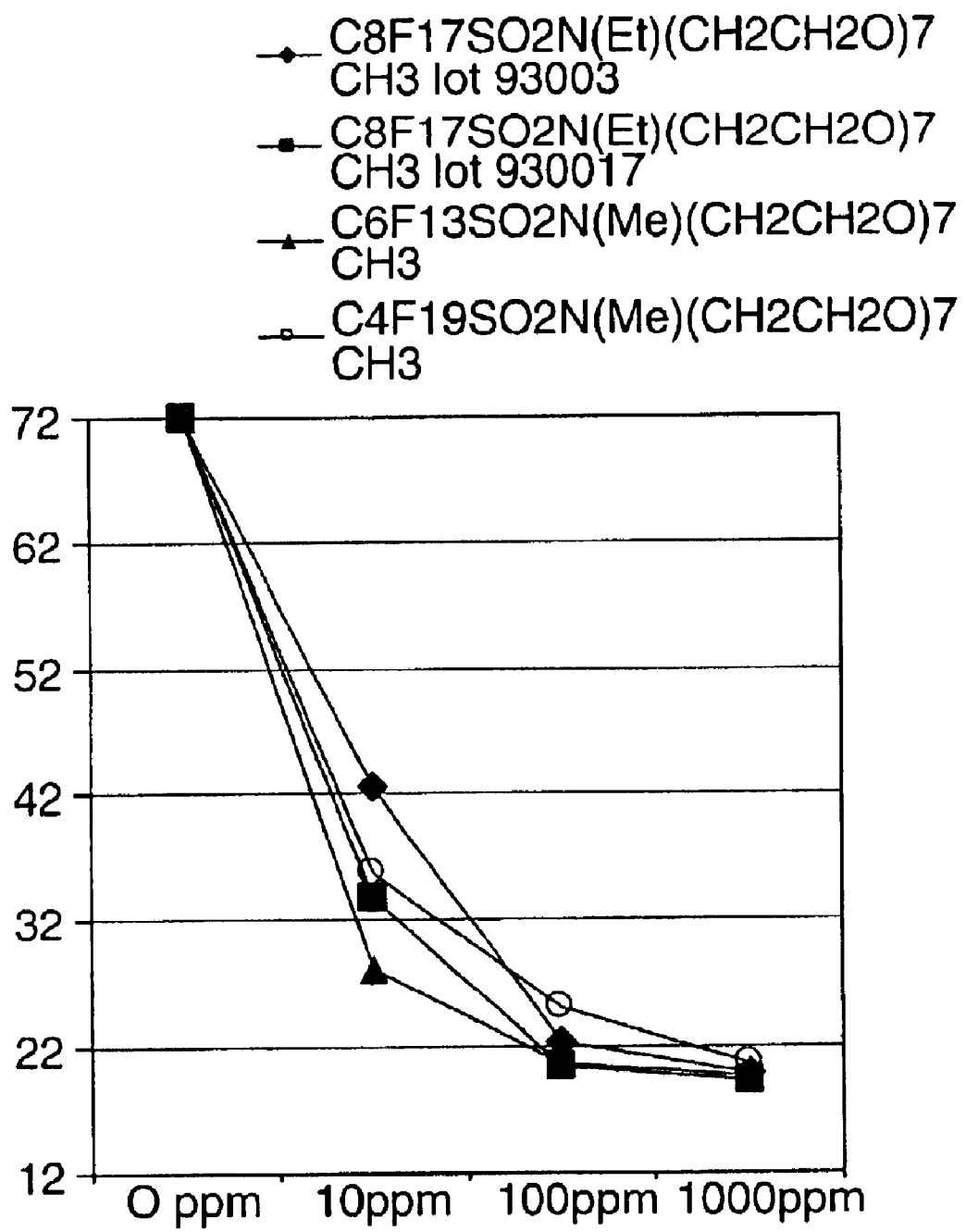
FIG. 5 is a graphic comparison of surface tensions in water of $C_8F_{17}$, $C_6F_{13}$ and $C_4F_9$ sulfonamido ethyleneoxy surfactants.

The surface tension in water of two lots of $C_8F_{17}SO_2N(Et)(CH_2CH_2O)_7CH_3$ (FC-171) was measured according to Test Procedure I. The results are shown in FIG. 5.

Comparative Example C6

Surface Tension of Water Containing $C_6F_{13}SO_2N(Me)(CH_2CH_2O)_7CH_3$

The adduct of MeFHSA (N-methyl-perfluorohexanesulfonamide) and a polyoxyethylene monomethyl ether was prepared as in Example 1, substituting perfluorohexanesulfonyl fluoride for PBSF, and N-methyl-perfluorohexanesulfonamide for MeFHSA. The surface tension in water of this adduct having the formula, $C_6F_{13}SO_2N(Me)(CH_2CH_2O)_7CH_3$, was measured according to Test Procedure I. The results are shown in FIG. 5.

Example 32

Surface Tension of Water Containing $(C_4F_9SO_2N(Me)(CH_2CH_2O)_7CH_3)$

The surface tension in water of the adduct of MeFBSA (N-methyl-perfluorobutanesulfonamide) and a polyoxyethylene monomethyl ether $(C_4F_9SO_2N(Me)(CH_2CH_2O)_7CH_3)$ prepared in Example 1 was measured according to Test Procedure I. The results are shown in Table 3 and plotted as a function of concentration (ppm) in FIG. 5 where it can be seen that the surface tension using the $C_4F_9$ segment is, surprisingly, very similar to that found when using the $C_8F_{17}$ segment with a polyalkyleneoxy side chain.

Comparative Example C7

Surface Tension of Toluene Containing EtFOSEMA (30%)/CW750 Acrylate (70%)

Figure 6:
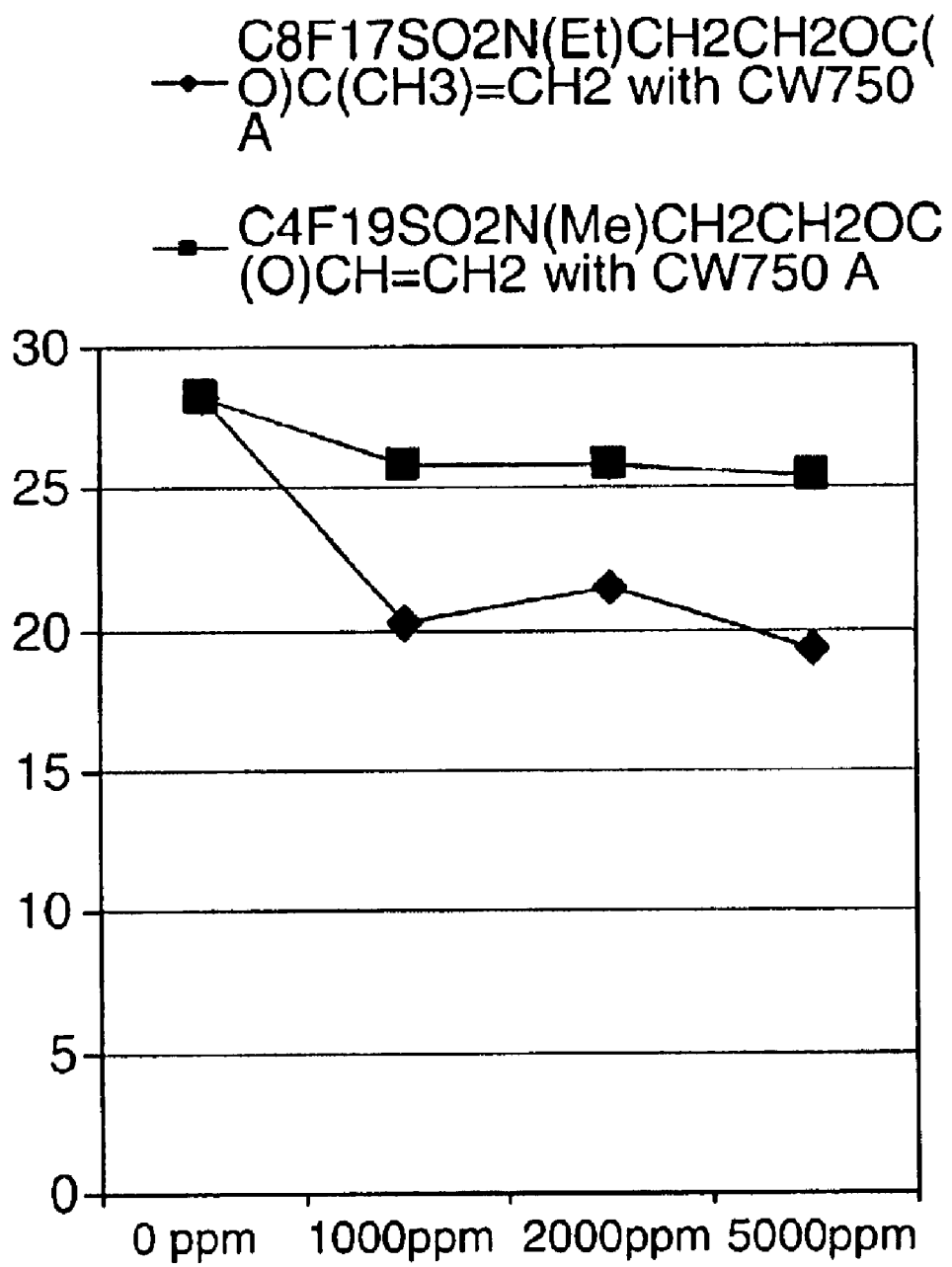
FIG. 6 is a graphic comparison of surface tensions in toluene of a $C_4F_9$ copolymeric surfactant and a $C_8F_{17}$ copolymeric surfactant.

A polymeric surfactant that is not soluble in aqueous media alone is 30% by weight fluorochemical monomer and 70% by weight CW 750 Acrylate. The surface tension in toluene of a surfactant prepared as in Example 2 (without the AMPS salt) with EtFOSEMA $(C_8F_{17}SO_2N(C_2H_5)CH_2CH_2OC(=O)C(CH_3)=CH_2)$ (30% by weight) (instead of MeFBSEA) and CW750 acrylate (70% by weight) was measured according to Test Procedure I. The results are shown in FIG. 6.

Example 33

Surface Tension of Toluene Containing (MeFBSEA (30%)/CW750 Acrylate (70%))

The surface tension in toluene of the Example 9 surfactant (MeFBSEA (30%)/CW750 Acrylate (70%)) was measured according to Test Procedure I. The results are shown in FIG. 6. The effect of surfactants on surface tension in solvents is much smaller than in water (*Fluorinated Surfactants*, edited by Erik Kissa, Marcel Dekker Inc. (1996), p. 134). Because the surface energy of solvents is already so low, hydrocarbon surfactants are often ineffective at providing any surface tension reduction (*Fluorinated Surfactants*, edited by Erik Kissa, Marcel Dekker Inc. (1996) p. 134, p. 325). FIG. 6 shows that the $C_4F_9$ bearing surfactant is not quite as effective as the $C_8F_{17}$ analog in toluene, but for a leveling surfactant like this material, the fact that any surface tension reduction is seen in an organic liquid like toluene with a surface tension of 27 dynes/cm, may make it possible for the surfactant to hold the surface tension at a low constant value during drying of a coating which enables it to prevent coating defects such as cratering.

Comparative Example C8

Surface Tension of Toluene Containing Mixed Surfactant

Figure 7:
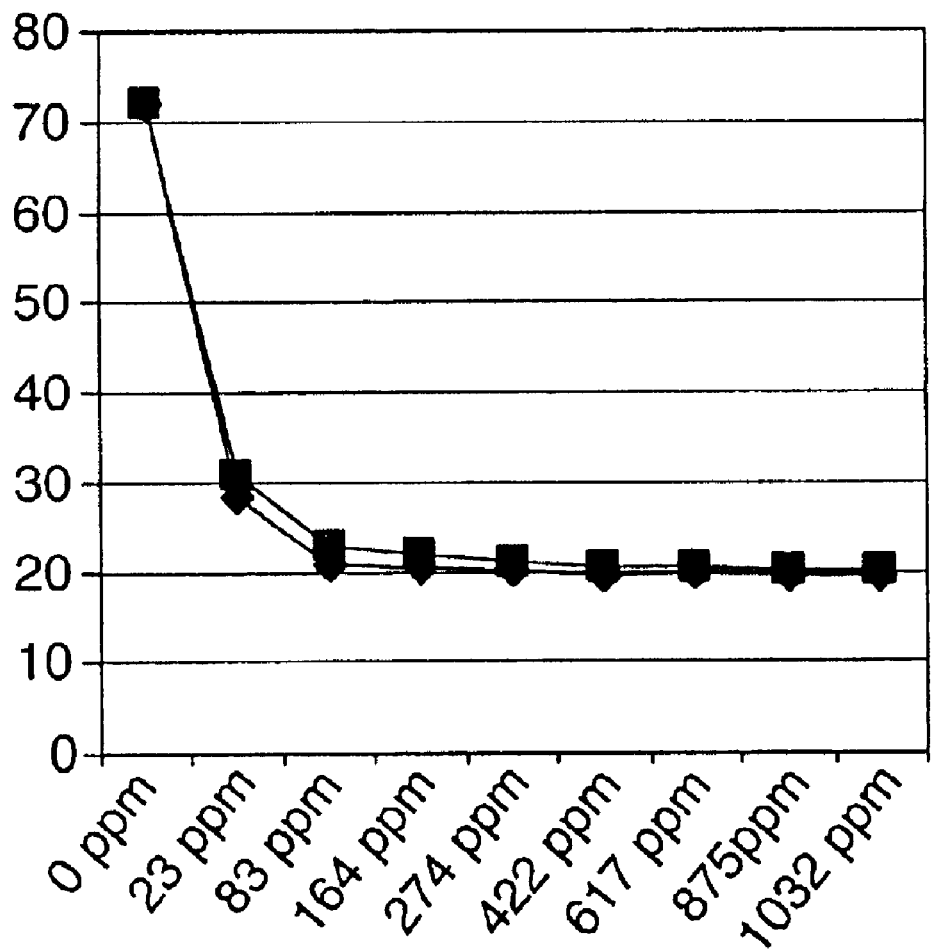
FIG. 7 is a graphic comparison of surface tensions in water of polymeric $C_4F_9$ and $C_8F_{17}$ perfluorosulfonamido surfactants combined with $C_4F_9$ and $C_8F_{17}$ perfluoroethoxylates.

The copolymer surfactant of Comparative Example 7 was mixed with $C_8F_{17}SO_2N(C_2H_5)(CH_2CH_2O)_7CH_3$ (FC-171) resulting in a mixed surfactant containing 30 weight % copolymer surfactant, 40 weight % FC-171, and 30 weight % ethyl acetate. The surface tension in water of the mixed surfactant was measured according to Test Procedure I. The results are shown in Table 3 and plotted as a function of surfactant concentration (ppm) in FIG. 7.

Example 34

Surface Tension of Water Containing $C_4F_9SO_2N(CH_3)(CH_2CH_2O)_{7.5}CH_3$ with MeFBSEA (30%)/CW750 Acrylate (70%)

The surface tension in water of Example 10 mixed surfactant solution (30 weight % copolymer surfactant, 40 weight % adduct, and 30 weight % ethyl acetate) was measured according to Test Procedure I. The results are shown in Table 3 and plotted as a function of surfactant concentration in FIG. 7, where it can be seen that the $C_4F_9$ containing mixed surfactant's performance was equivalent to that of the $C_8F_{17}$ containing mixed surfactant.

Comparative Example C9

Surface Tension of Water Containing $C_8F_{17}SO_2N(C_2H_5)CH_2CO_2^-K^+$ (FC-129)\

Figure 8:
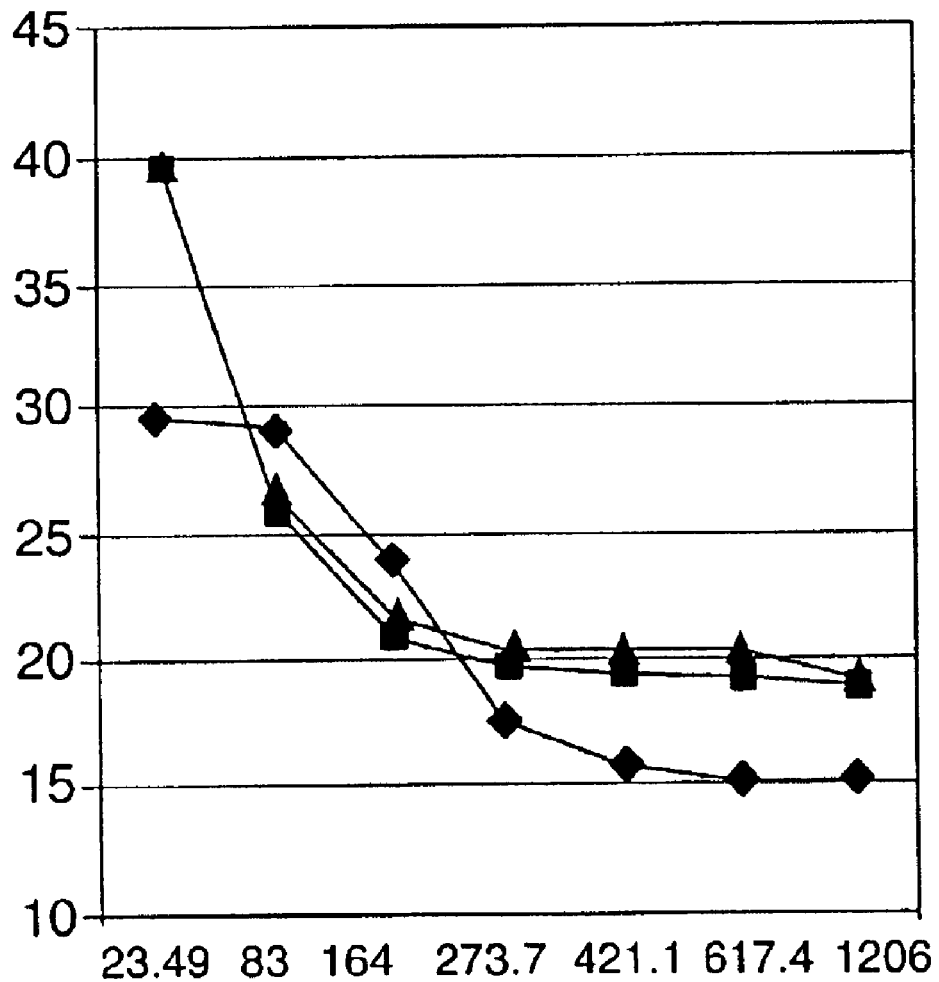
FIG. 8 is a graphic comparison of surface tensions in water of a $C_4F_9$ copolymeric surfactant and a $C_8F_{17}$ copolymeric surfactant.

The surface tension in water of the ionic surfactant, $C_8F_{17}SO_2N(C_2H_5)CH_2CO_2^-K^+$ (FC-129) was determined at concentrations of 23–1032 ppm according to Test Procedure I. The results are shown in Table 3 and plotted as a function of concentration in FIG. 8.

Comparative Example C10

Preparation of EtFOSEA (30%)/CW750 Acrylate (65%)/AMPS monomer (5%);

Surface Tension of Water Containing EtFOSEA (30%)/CW750 Acrylate (65%)/AMPS monomer (5%)

In this example the random acrylic copolymer of EtFOSEA (30 weight %) with CW750 acrylate (65 weight %) and AMPS monomer (2-acrylamido-2-methylpropanesulfonic acid) (5 weight %) was prepared and tested for surface tension in water.

The following charges were added to a 500 ml flask under positive nitrogen pressure.

Charges:
  15 g EtFOSEA $(C_8F_{17}SO_2N(C_2H_5)CH_2CH_2OC(=O)CH=CH_2)$
  32.5 g CW750A
  2.5 g AMPS monomer
  2.5 g 2,2'-Azobisisobutyronitrile
  2.0 g 3-mercapto-1,2-propanediol
  117 g 1-methyl-2-pyrrolidinone
  2.8 g N-Methyldiethanolamine The batch was heated to 79° C. for 5 hours. The solids content was found by evaporation of a small quantity to be 28% by weight of the resulting polymer solution.

The surface tension in water of this copolymer surfactant was measured according to Test Procedure I. The results are shown in Table 3 and plotted as a function of surfactant concentration in FIG. 8 where surface tension is plotted as a function of parts per million of the copolymer surfactant.

Example 35

Evaluation of (MeFBSEA (30%)/CW750 Acrylate (65%)/AMPS (5%)

In this example the random acrylic copolymer surfactant of Example 5 (MeFBSEA (30 weight %) with CW750 acrylate (65 weight %) and AMPS monomer (2-acrylamido-2-methylpropanesulfonic acid) (5 weight %)) was evaluated.

The surface tension in water of this copolymer surfactant was measured according to Test Procedure I. The results are shown in Table 3 and plotted as a function of concentration (ppm) in FIG. 8 where surface tension is plotted as a function of parts per million of the copolymer surfactant. The $C_4F_9$ containing surfactant performed equal to or better than the corresponding $C_8F_{17}$ containing surfactant and better than the ionic surfactant, $C_8F_{17}SO_2N(C_2H_5)CH_2CO_2^-K^+$ (FC-129) (Comparative Example 8) at levels below 200 ppm.

TABLE 3

Surface Tensions (dynes/cm) of Surfactants of Examples 29, 31–35, and Comparative Examples C3–C10 at Various Concentrations in Water

| Surf. Ten. Ex. | Surfact. Ex. | Surface Tension (dynes/cm) at Various Surfactant Concentrations | | | | | | | |
|---|---|---|---|---|---|---|---|---|---|
| | | 23 ppm | 83 ppm | 164 ppm | 273 ppm | 421 ppm | 617 ppm | 875 ppm | 1023 ppm |
| C3 | C3 | 32 | 29.5 | 27.5 | 25.9 | 25.1 | 24.6 | 24.1 | 24.1 |
| 29 | 6 | 29.6 | 27 | 24 | 23 | 22 | 22 | 21.8 | 21.8 |
| C4 | C4 | 67 | 36.5 | 27.5 | 26 | 25 | 24 | 24.3 | 24.3 |
| 31 | 8 | 47 | 30 | 23 | 20 | 20 | 20 | 20 | 20 |
| C5 | C5 | 33.5 | 21 | 20.5 | 19.5 | 19 | 19 | 19 | 19 |
| 32 | 1 | 31 | 24 | 23 | 22.5 | 22 | 21.5 | 20 | 20 |
| C8 | C8 | 28.3 | 20.7 | 20.4 | 20.2 | 19.6 | 19.7 | 19.5 | 19.6 |
| 34 | 10 | 30.8 | 22.8 | 21.9 | 21.1 | 20.5 | 20.5 | 20.3 | 20.3 |
| C9 | C9 | 29.5 | 29 | 24 | 17.5 | 16 | 15.5 | 16 | 16.5 |
| C10 | C10 | 40 | 26.5 | 21.8 | 20.5 | 20.5 | 20.5 | 20.5 | 19.5 |
| 35 | 5 | 39.5 | 25.9 | 21.0 | 19.9 | 19.6 | 19.4 | 19.2 | 19.1 |

The results in Table 3 show that the surface tensions provided by $C_4F_9$ surfactants (Examples 6, 8, 1, 10, and 5) were surprisingly similar to or even lower than the surface tensions provided by $C_8F_{17}$ surfactants of comparable structure (Comparative Examples C3, C4, C5, C8, and C10, respectively).

Comparative Example 11

Contact Angle of FC-129 in Water

A 0.01 weight % solution of FC-129 in HPLC grade water was tested for contact angle according to Test Procedure II, and for wetting and dried film characteristics according to Test Procedure III. Contact angle results are shown in Table 4. On clean glass the solution was found to be hydrophobic. The dried film was found to be autophilic and clear. The dried film gave a hydrophilic characteristic to water and to the surfactant solution.

Example 36

Contact Angle of MeFBSEA (62%)/CW750 Acrylate (19%)/AMPS (19%)

A 0.01 weight % solution of the surfactant copolymer of Example 2 in HPLC grade water was tested for contact angle according to Test Procedure II, and for wetting and dried film characteristics according to Test Procedure m. Contact angle results are shown in Table 4. On clean glass the solution was found to be hydrophobic. The dried film was found to autophilic and clear. The dried film gave a hydrophilic characteristic to water and to the surfactant solution. These results are the same as those found with the known surfactant, FC-129, tested in Comparative Example 9. This indicates that the copolymer surfactant of the present invention made in Example 2 is usable in cleaning solutions where known surfactants such as FC-129 have been used effectively.

TABLE 4

Advancing and Receding Contact Angles of 0.01 Weight % Surfactant Solutions on Clean Glass and Glass with a Film of Dried Surfactant Solution.

| Example or Comparative Example No. | Advancing CA on Clean Glass | Receding CA on Clean Glass | Advancing CA on Dried Surfactant | Receding CA on Dried Surfactant |
|---|---|---|---|---|
| 36 | 39.5 | 4.8 | 42.6 | 18.5 |
| C11 | 61.6 | 7 | 64.6 | 12.2 |

Lower contact angles indicate better wetting, and when the receding contact angle is lower than the advancing contact angle the solution will remain spread out during drying. The results in Table 4 show that the copolymer surfactant provides surprisingly low contact angles (Example 36) relative to the control FC-129 (Comparative Example C11), indicating very good wetting and spreading properties. These results show that the copolymer surfactant can be used successfully in cleaning solutions were FC-129 has been used effectively.

Comparative Example C12

Preparation of Cellular Adhesive Membrane Tape with and without a $C_8F_{17}$ Surfactant

A cellular adhesive membrane tape was made without and with a $C_8F_{17}$ surfactant essentially as described in U.S. Pat. No. 4,415,615 (Esmay, et al). Into a mixture of isooctyl acrylate (87.5 parts by weight), acrylic acid (12.5 parts by weight), and fumed silica (Aerosil R972, Degussa, Germany, 2 parts by weight) was stirred 0.04% by weight of 2,2-dimethoxy-2-phenylacetophenone (Irgacure™ 651 available from Ciba Geigi Corp.). This was partially polymerized to provide a syrup with a viscosity of about 3000 cps by exposure to ultraviolet radiation. To the syrup was added 0.10% by weight of additional Irgacure™ 651, 2% by weight of a surfactant solution, and 0.055% by weight of hexanediol diacrylate crosslinking agent. The surfactant solution was 50% by weight Comparative Example C7 surfactant and 50% by weight ethyl acetate. The resulting mixture was slowly mixed with an air motor, taking care not to cause any frothing. The mixture was transferred to a 90-mm frother operating at 900 rpm. While nitrogen gas was fed into the frother, the frothed syrup was delivered through 12.5 mm tubing to the nip of a roll coater between a pair of transparent, biaxially-oriented polyethylene terephthalate films, the facing surfaces of which had low-adhesion coatings. The tubing was partially constricted by a clamp to provide a desired pressure in the frother.

The composite emerging from the roll coater was irradiated with a bank of fluorescent black light bulbs (Sylvania F20T12BS), 90% of the emissions of which were between 300 and 400 nm, maximum intensity at 351 nm. The exposure was 300 mJ from each side for a total of 600 mJ, as measured by a Dynachem Radiometer, which was spectrally responsive between 300 and 400 nm, maximum at 351 nm. This total did not include the radiation absorbed by the polyethylene terephthalate film. The composite was cooled by blowing air against both films during the irradiation to keep the temperature of the films below 85° C. to avoid wrinkling of the films.

The resulting cellular pressure sensitive adhesive membrane tape was given a visual composite rating for uniformity, density, and cell size. Membranes having a high degree of cell size uniformity, a high density of cells, and small cell size were given relatively high numerical ratings, while membranes having a lesser degree of cell size uniformity, a lower density of cells, and larger cell size were given relatively lower numerical ratings. A rating of 9 or greater was considered excellent, 8 was very good, 7 was good, and 6 was fair. The rating results are shown in Table 5.

Color of the resulting cellular pressure sensitive adhesive membrane tape was also measured using calorimeter (Hunter Lab D25 A Optical Sensor). After calibrating the sensor, the sample was placed in front of the sensor with the black calibration plate directly behind it. The clear polyester films were left on both sides of the samples. The measurement was then taken, and the L value was recorded. A higher L value indicated less light reflected back from the black panel due to more light scattering by a more opaque sample. Therefore, samples with a better froth (more, smaller cells) had a higher L value. The L value of the membrane tape is shown in Table 5.

Examples 37–51

Preparation of Cellular Adhesive Membrane Tape with a $C_4F_9$ Surfactant

Various surfactant solutions of the present invention were used to make cellular pressure sensitive adhesive membrane tapes essentially as in Comparative Example C12. The surfactant solutions were 50% by weight ethyl acetate, 20% by weight Example 1 surfactant, and 30% by weight a copolymer surfactant of the present invention. The membrane tapes were visually rated and the L values were determined essentially as in Comparative Example C12, and the results are shown in Table 5.

TABLE 5

Visual Ratings and L Values for Cellular Pressure Sensitive Adhesive Membrane Tapes Made with Various Surfactants.

| Cellular Membrane Example | Copolymer Surfactant Example | Copolymer Surfactant | Visual Rating | L value |
|---|---|---|---|---|
| C12 | None | None | 2 | 37 |
| C12 | C7 | EtFOSEMA/CW750A (30:70) | 9.0 | 67 |
| 37 | 3 | MeFBSEA/CW750A (35:65) | 8.0 | 61 |
| 38 | 11 | MeFBSEA/CW750A (30:70) | 7.0 | 63 |
| 39 | 12 | MeFBSEA/CW750A/DMAEMA/AMPS (40:51:4:5) | 9.0 | 64 |
| 40 | 13 | MeFBSEA/CW750A/StMA/DMAEMA/AMPS (30:23:30:7:10) | 6.0 | 53 |
| 41 | 14 | MeFBSEMA/CW750A (30:70) | 8.0 | 62 |
| 42 | 15 | MeFBSEMA/CW750A/AMPS (56:33:11) | 9.0 | 68 |
| 43 | 24 | MeFBSEMA/StMA/AA (53:33:14) | 7.0 | 64.5 |
| 44 | 16 | MeFBSEMA/CW750A/AA (55:35:10) | 9.0 | 71 |
| 45 | 17 | MeFBSEA/CW750A (50:50) | 7.0 | 64 |
| 46 | 18 | MeFBSEMA/CW750A (50:50) | 9.0 | 67 |
| 47 | 19 | MeFBSEA/CW750A/DMAEMA/AA (40:54:4:2) | 8.0 | 63 |
| 48 | 20 | MeFBSEA/CW750A/DMAEMA/AA (40:49:8:3) | 8.0 | NR |
| 49 | 21 | MeFBSEA/CW750A/AA (55:35:10) | 8.8 | 64 |
| 50 | 22 | MeFBSEA/CW750A/AA (55:35:10) | 8.8 | 64 |
| 51 | 23 | MeFBSEA/CW750A/AA (55:35:10) | 9.3 | 68 |

The results in Table 5 show that many of the copolymer surfactants of the present invention in combination with the surfactant of Example 1 were useful in making cellular pressure sensitive adhesive membrane tapes, and that several of the copolymer surfactants of the present invention in combination with the surfactant of Example 1 (Examples 39, 42, 44, 46, 49–51) performed equal to or better than the $C_8F_{17}$ surfactant (Comparative Example C12).

Comparative Example C13

Evaluation of Foam Forming Media Containing Surfactant EtFOSEA/CW750 Acrylate/AMPS/DMAEMA In this example a random copolymer surfactant of EtFOSEA with CW750 acrylate, AMPS, and DMAEMA was prepared and evaluated for foam height in water solutions saturated with heptane. The following charges were added to a 1000 ml flask under positive nitrogen pressure:

40 g EtFOSEA 51 g CW750 Acrylate 5 g AMPS 4 g DMAEMA 8 g t-butyl peroctoate (50% solids in mineral spirits)

3 g mercaptopropanediol 233 g 1-methyl-2-pyrrolidinone

The batch was heated to 90° C. for 6 hours. The solids content was found to be 29.4% by weight of the resulting polymer solution by evaporation of a small quantity.

Using the resulting polymer solution, an aqueous solution containing 0.05 weight % of the above EtFOSEA/CW750A/AMPS/DMAEMA surfactant was prepared. The aqueous solution was saturated with heptane. A 50 ml portion of the resulting heptane-saturated solution was foamed by shaking the solution in a volumetric flask until the maximum amount of foam formed, and the volume of the foam was measured 0.1, 0.5, and 1 minute after the foam-forming step was stopped. The result is shown in Table 6.

Using sea water, aqueous solutions containing 0.1 weight % of the above EtFOSEA/CW750A/AMPS/DMAEMA surfactant without and with 0.5 weight % of AOS were similarly prepared. A 10 ml portion of each resulting heptane-saturated solution was foamed as above, and the foam volume was measured five minutes after the foam-forming step was stopped. The results are shown in Table 7.

Examples 52–56

Evaluation of Foam Forming Media Containing $C_4F_9$ Surfactants

The copolymer surfactants of Examples 12, and 25–28 were evaluated for foam formation and stability in heptane-saturated solutions essentially as described in Comparative Example C13. The results are shown in Tables 6 and 7.

TABLE 6

Foam Volumes Formed from 50 ml Quantities of Water Saturated with Heptane and Containing 0.05 Weight % of Various Surfactants.

| Foam Example | Surfactant Example | Foam Volume (ml) at Various Times After Foaming | | |
|---|---|---|---|---|
| | | 0.1 min. | 0.5 min. | 1.0 min. |
| C13 | C13 | 64 | 63 | 62 |
| 52 | 12 | 69 | 68.5 | 68 |
| 53 | 26 | 68 | 66 | 66 |
| 54 | 27 | 63 | 60 | 60 |

The results in Table 6 show that the $C_4F_9$ copolymer surfactants of Examples 12, 26, and 27 were very effective in forming a large, stable volumes of heptane-saturated water foam.

TABLE 7

Foam Volumes Formed from 10 ml Quantities of Water Saturated with Heptane and Containing 0.1 Weight % of Various Surfactants wo/w 0.5% AOS.

| Foam Example | Surfactant Example | Foam Volume (ml) 5 Minutes After Foaming | |
|---|---|---|---|
| | | Without AOS | 0.5% AOS |
| C13 | C13 | 19 | 49 |
| 55 | 12 | 23 | 38 |
| 56 | 25 | 19 | 41 |
| 57 | 26 | 23 | 45 |
| 58 | 27 | 13 | 34 |
| 59 | 28 | 14 | 42 |

The results in Table 7 show that the $C_4F_9$ copolymer surfactants of Examples 12, and 25–28 were effective in forming large, stable volumes of heptane-saturated sea water foam.

Comparative Example C14

Polyurethane Coating on Clean Substrate

A clear water-based polyurethane (7114 Safe and Simple™ Gloss polyurethane sold by Carver Tripp, Parks Corp, Fall River, Mass. 02720) was spread with a paint brush on a standard 7.6 cm by 15.2 cm finished ground metal coating panel, resulting in a smooth clear polyurethane coating without coating defects after drying.

Comparative Example C15

Polyurethane Coating on Oil Contaminated Substrate

Comparative Example C14 was essentially repeated except that prior to application of the polyurethane coating the metal panel was coated with machine oil (3-In-One, available from WD-4Co., San Diego, Calif.) and wiped dry with paper towels. The water-based polyurethane was spread on this panel in the same manner as previously described, resulting in a coating that shrank back from the edges to form an irregular, blotchy streak down the middle of the panel after drying.

Example 60

Polyurethane Coating Containing MeFBSEA (22.8%)/Pluronic™ Acrylate (77.2%)on Oil Contaminated Substrate A 0.2% solution of the surfactant of Example 4 was prepared by dissolving 0.40 grams of the surfactant of Example 4 in 200 grams of 7114 Safe and Simple™ Gloss (a clear water based polyurethane) sold by Carver Tripp, Parks Corp, Fall River, Mass. 02720. Comparative Example C15 was essentially repeated except that the panel coated with machine oil, and wiped dry with paper towels was coated with the water-based polyurethane with 0.2% of surfactant of Example 4. The resulting polyurethane coating dried clear and level all the way to the edges of the panel without any coating defects. The resulting panel was identical in appearance and color to the panel of Comparative Example C14 on which the water-based polyurethane was spread on a clean metal panel.

Thus, the results of Example 60 and Comparative Examples C14 and C15 demonstrated the effectiveness of the surfactant of Example 4 in producing a defect-free water-based polyurethane coating on a surface that was difficult to wet.

Comparative Example C16

Floor Finish Formulation

A floor finish formulation was prepared by combining the following ingredients:

| Ingredient Number | Ingredient | Parts by Weight |
|---|---|---|
| 1 | Deionized water | 45 |
| 2 | Diethylene glycol monoethyl ether | 5.28 |
| 3 | SE21 (antifoam emulsion, available from Wacker Silicones Corp., Adrian, MI) | 0.02 |
| 4 | KP-140 (tributoxyethyl phosphate, available from Great Lakes Chemical corp., West Lafayette, IN) | 1.31 |
| 5 | Dibutyl phthalate | 0.7 |
| 6 | Mor-glo 2 latex (styrene acrylic emulsion polymer, available from Omnova Solutions, Inc., Chester, SC) | 39.43 |
| 7 | MC-28 (styrene acrylic solution, available from Omnova Solutions, Inc., Chester, SC) | 3.52 |
| 8 | 325 N 35L (high density polyethylene emulsion, available from ChemCor, Chester, NY) | 2.53 |
| 9 | 43N40 (nonionic polyolefin wax emulsion, available from ChemCor, Chester, NY) | 2.21 |
| 10 | KP-140 | 0.5 |
| 11 | FC-129 | 0.02 |

Ingredients 1–3 were combined and mixed with a blade driven by an air motor for 15 minutes, and then ingredients 4–5 were added and mixed for 15 minutes. Ingredient 6 was then added to the resulting solution and mixed for 15 minutes, followed by the addition of ingredients 7–9. The resulting solution was further mixed for 30 minutes, and then ingredients 10 and 11 were added with additional mixing for 30 minutes using a magnetic stir bar. The resulting floor finish formulation was evaluated for gloss at 60° after four coats, film formation at ambient conditions, water resistance, detergent resistance, removability, black mark and scuff mark resistance, and soil resistance.

For evaluation of gloss at 60°, four coats of the floor finish formulation were applied to a 929 $cm^2$ scrubbed tile (Armstrong white vinyl composite tile from St. Paul Linoleum, St. Paul, Minn. scrubbed using a 3M Super Polish (White) Floor Pad™ with 3M 3-in-1 Floor Cleaner Concentrate™ (24H) diluted using Twist and Fill™ applicator—3M, St. Paul, Minn.). For each coat, 4 mLs of finish was applied to a 929 $cm^2$ tile using a 5.1 cm by 5.1 cm, 4 ply, NU Gauze fabric from Johnson and Johnson (Arlington, Tex.). Each coating was dried for at least 20 minutes before the next coat was applied. After four coats, gloss at 60° was measured using a Byk Gardner (Silver Spring, Md.) micro-TR-glossmeter. Three measurements for each coating were taken and averaged. The results are shown in Table 8.

For evaluation of film formation at ambient conditions, 0.4 mLs of finish was applied with a 5.1 cm wide blade applicator over a length of 10.2 cm on a new Armstrong black vinyl composite tile (from St. Paul Linoleum, St. Paul, Minn.) scrubbed as above. After drying for at least 20 minutes, a visual rating was given in terms of wetting and leveling of the finish. A dried finish that uniformly wetted the tile and displayed a smooth, level finish was rated excellent for film formation. The results are shown in Table 8.

For water resistance, detergent resistance, and removability evaluations four coats of finish formulation were applied to a black vinyl composite tile, described and scrubbed as above. The 929 $cm^2$ tile was divided in half and the above finish formulation and an experimental finish formulation (described below as Example 61) were applied to the same tile (2 mLs of each finish formulation was used in each coat). Each coat was allowed to dry for at least 20 minutes. The tile was not tested until at least 24 hrs had passed. In the water resistance test, gloss at 60° was measured as described above. Then 9 drops of tap water were placed in approximately a 2.5 cm diameter sized area for 1 hour. The water was blotted dry and after 1 hour the gloss at 60° was again measured. The percent change in gloss was reported. For detergent resistance, the coated tiles were place in an Abrasion Tester (Byk Gardner, Silver Spring, Md.). 10 mLs of 32:1 water diluted 3M Neutral Cleaner Concentrate™ (3H) were injected into a 3M White Floor Pad™ and the machine was run for 200 cycles. The gloss before and after this test was measured and the percent change was reported. In the removability test, the same machine was run now using 3M Speed Stripper™ (6H) diluted using Twist and Fill™ applicator for 75 cycles. The tiles were then visually examined to determine if all of the floor finish had been removed. The results are shown in Table 8.

For black mark and scuff mark resistance evaluations, the tiles used for the original 60° gloss measurement were used. The test was carried out in a Snell Soiling Capsule, a motordriven, rotating, hexagonal box whose sides are designed to hold the test tiles in place during the test. The Capsule, containing six 5.1 cm by 5.1 cm by 5.1 cm black rubber cubes, was rotated at 50 rpm for 2½ minutes in each direction. The black marks (discoloring marks) on the 929 $cm^2$ tiles were counted and the scuff marks (non-discoloring marks) in a randomly selected 19.4 $cm^2$ area were counted. The results are shown in Table 8.

For the soiling evaluation, white, scrubbed tiles as described above for the 60° gloss test were coated as in the method described for water and detergent resistance above. A Gardner Straight Line Washability and Abrasion Machine (Byk Gardner) was used. A loop nylon kitchen style carpet was attached to the roller and 2 grams CSMA soil (Rohm & Haas, Philadelphia, Pa.) were placed on the carpet. After 25 cycles, the soil was removed and the machine was run for another 175 cycles. A Microflash™ 200d instrument (Illum= d65/10° at 2.54 cm aperture—Datacolor International, Lawrenceville, N.J.) was used to measure the color change of the tile before and after soiling. Six measurements were taken, and the mean color difference ($\Delta E$ using CIE Lab calculations) was reported. The results are shown in Table 8.

Example 61

Floor Finish Formulations Containing Fluorochemical Surfactants

Comparative Example C16 was essentially repeated except that 0.17 parts of the surfactant solution of Example 5 was used instead of FC-129. The results are shown in Table

8.

TABLE 8

Evaluations of Floor Finish Formulations
with FC-129 and with Surfactant Solution of Example 5.

| Evaluation Test | Evaluation Test Results | |
|---|---|---|
| | Comparative Example C16 | Example 61 |
| 60° Gloss | 72.0 +/− 0.3 | 75.7 +/− 0.04 |
| Film formation | Excellent | Excellent |
| Water resistance (Δ 60° gloss) | 0% | 1% |
| Detergent resistance (Δ 60° gloss) | 1% | 0% |
| Removability (after 75 cycles) | Completely removed | Completely removed |
| Black marks (number) | 7 | 5 |
| Scuff marks (number) | 8 | 5 |
| Soil resistance (ΔE) | 10 ± 2 | 11 ± 1 |

The results in Table 8 show that the polymeric surfactant of Example 5 imparted excellent floor finish properties as compared with the properties imparted when FC-129, a widely used surfactant for floor finishes, was used.

Comparative Example C17

Screen Printing Formulation Containing $C_8F_{17}$ Surfactant

A solvent-based, screen printing, clear coat was prepared by combining 19.50 weight % A-11™ resin (a poly(methyl methacrylate) acrylic resin from Rohm and Haas, Spring House, Pa.), 4.90 weight % VAGH™ resin (a solution vinyl resin from Union Carbide, Danbury, Conn.), 13.4 weight % Uniflex™ V312 (plasticizer available from Union Camp Chemicals, Dover, Ohio), 1.40 weight % Uvinal™ 400 (2,4-dihydroxy benzophenone, available from BASF Corp., Chicago, Ill.), 0.29 weight % Tinuvin™ 292 (light stabilizer, available from Ciba-Geigy Corp., Ardsley, N.Y.), 0.5 weight % of the surfactant of Comparative Example C3, 0.25 weight % of an 8% solution of the SF96-1000 (silicone from General Electric, Waterford, N.Y.) in Penola 150 (an aromatic hydrocarbon solvent from Exxon Company, Baytown, Tex.), 21.00 weight % cyclohexanone (available from Allied signal, Inc., Hopewell, Va.), 11.86 weight % Penola 150, 9.20 weight % Butylcellosolve-Acetate (Eastman Chemicals, Inc., Kingsport, Tenn.), and 17.70 weight % Ethylethoxy-Propionate (Eastman Chemical Co., Kingsport, Tenn.). The resulting clear coat resin formulation was coated onto Controltac™ 180-10 film (plasticized vinyl film with a pressure sensitive adhesive on a release liner, available from 3M Commercial Graphics Division, St. Paul, Minn.) with a KB number 2 (red handle) wire wound rod. The resulting coated samples were allowed to air dry before further testing. The surface energy of the dried, coated samples was measured using the advancing contact angles of water and hexadecane. The advancing and receding contact angles were measured using a Rame-Hart NRL (Rame-Hart Company, Mountain Lake, N.J.) goniometer. The surface energy were calculated by the method of Kaelble, a geometric mean approximation. This method separated the total surface energy into dispersion and polar surface energy components. The total surface energy was the sum of these two components. The receding contact angle of hexadecane was used as an indicator of dirt resistance. The larger the receding contact angle, the better the dirt resistance was expected to be. Undesirable dirt is carbonaceous in nature and is non-polar. Hexadecane has no polar component to its surface energy and is used as a model for dirt. The results are shown in Table 9.

Dried, coated samples were also visually evaluated for dirt resistance. A fine soot was applied to a sample using a cotton swab by brushing the soot across the test area of the sample fifty times in lateral, longitudinal, and diagonal directions. After application of the soot, the sample had a dark gray appearance, looking smudged and dirty. After one week the test area was wiped with a dry chemical wipe towel to remove the surface soot, and found to have a dirty appearance. After two weeks the test area was almost entirely gray, with the paths of the cotton swab no longer appearing distinct.

Another dirt resistance test was run by dropping a small amount of soot onto one of the dried, coated samples from a flat wooden spatula from a distance of 5.1 cm above the sample. The soot was then dumped off the sample, and the sample was tapped on a hard surface to remove any remaining loose soot. A dark path was evident on the resulting sample where the soot was dumped and slid on the sample.

The dried, coated samples of Comparative Example C17 were considered to have good dirt resistance.

Comparative Example C18

Screen Printing Formulation Without Fluorochemical Surfactant

Comparative Example C17 was essentially repeated except that the Comparative Example C3 surfactant was not included and the visual dirt resistance tests were not run. The results are shown in Table 9.

Example 62

Screen Printing Formulation Containing $C_4F_9$ Surfactant

Comparative Example C17 was essentially repeated except that the surfactant of Example 16 was used instead of the Comparative Example C3 surfactant. The results are shown in Table 9.

After application of the soot, the sample was considerably cleaner and lighter in appearance than Comparative Example C17. After one week the test area was wiped with a dry chemical wipe towel to remove the surface soot, and found to have a less dirty appearance than C17. After two weeks the test area looked similar to its one-week appearance.

Inspection of the sample after the dirt resistance test, run by dropping a small amount of soot onto one of the dried, coated samples, revealed a light gray spot where the soot was dumped and an even fainter trace where the dirt slid off the sample. Thus, the visual dirt resistance tests strongly supported the conclusions drawn from the contact angle measurements. The dried, coated samples of Example 62, which were subjected to dirt resistance testing, exhibited a cleaner appearance than Comparative Example C17 similarly treated, indicating that the surfactant of Example 16 provided improved performance.

Example 63

Contact Angles and Surface Energies of Screen Printing Clear Coat

Example 62 was essentially repeated except that the SF96-1000 and Penola 150 were not included. The results are shown in Table 9.

TABLE 9

Contact Angles and Surface Energies of Screen Printing, Clear Coat with Comparative Example C3 Surfactant, with Example 16 Surfactant, and without Surfactant.

| Clear Coat | Surfactant | Hexadecane | | Water | Surface Energy (dyne/cm) | | |
|---|---|---|---|---|---|---|---|
| Example | Example | Advancing | Receding | Advancing | Dispersion | Polar | Total |
| C17 | C3 | 69 | 28 | 75 | 12.7 | 16.7 | 29.4 |
| C18 | None | 6 | 4 | 95 | 27.4 | 1.5 | 28.9 |
| 62 | 16 | 68 | 50 | 89 | 13.0 | 8.0 | 21.0 |
| 63 | 16 | 68 | 44 | 88 | 13.0 | 8.5 | 21.5 |

The results in Table 9 show that surfactant of Example 16 provided surprisingly high hexadecane receding contact angles and low surface energies compared with no surfactant and compared with the $C_8F_{17}$ surfactant of Comparative Example C3. The high contact angles and low surface energies were predictive of improved dirt resistance.

Comparative Example C19

Silane Treatment of Glass Beads

Glass beads having an average diameter of 200 microns and an index of refraction of 1.75, prepared according to the teaching of U.S. Pat. No. 4,564,556, were pretreated with 600 ppm (by weight of the glass beads) of gamma-aminopropyltriethoxysilane commercially available from OSi Specialties (Danbury, Conn.) under the trade designation "Silquest A-1100". The resulting silane treated glass beads were tested for % float in heptane, Coefficient of Retroreflection (RA), initial adhesion, and accelerated aging adhesion according to the following test methods. The results are shown in Table 10.

Heptane Floatation Test—A single layer of optical elements was spread on a clean inverted pint paint can lid. Heptane was slowly introduced with a syringe or dropper at the edge of the lid until it overflows. The percentage of optical elements floating was estimated visually. In the absence of indicating otherwise, the beads were tested within 24 hours of being coated with the surface treatment.

Initial Adhesion Test—A liquid polyurethane binder having the following components was prepared:

| | |
|---|---|
| 27 wt-% | Rutile titanium dioxide pigment (commercially available under the trade designation Tipure R-960"from Dupont, New Johnsonville, TN) |
| 25 wt-% | polyester polyol (commercially available under the trade designation "Tone 0301"from Union Carbide Corp., Danbury, CT) |
| 50 wt-% | aliphatic polyisocyanate (commercially available under the trade designation Desmodur N-100 from Bayer Corp., Pittsburgh, PA) |

The polyurethane binder was coated on a paper liner at a thickness of 0.4 mm. Immediately thereafter, glass beads were cascade-coated over the binder maximizing the number of adhered beads per surface area of binder. The bead coated binder was then cured in an oven for 30 minutes at 100° C. After curing, the bead-coated binder film was examined under a microscope and the percentage of beads that were embedded in the binder was estimated. The sample passes when the optical elements are embedded to about 40–70% of their diameters.

Accelerated Aging Adhesion Test

A 0.635 cm by 2.54 cm piece of cured bead-coated binder film prepared for the Initial Adhesion Test is placed in a flask of boiling water for 24 hours. The aged sample is then inspected under a microscope to determine whether the optical elements remain embedded. The sample passes when the sample appears approximately the same as the initial sample and the beads are difficult to remove with a dissection probe.

Coefficient of Retroreflection (RA), in $cd/Lux/m^2$, was measured at an entrance angle of −4.0 degrees and an observation angle of 0.2° according to Procedure B of ASTM Standard E 809-94a. The photometer used for those measurements is described in U.S. Defensive Publication No. T987,003.

Comparative Example C20

Glass Beads Without Surface Treatment

Comparative Example C19 was essentially repeated except that no silane pretreatment was used. Results are shown in Table 10.

Example 64

Treatment of Glass Beads with Both Silane and MeFBSEMA (55%)/CW750 Acrylate (35%)/Acrylic Acid (10%)

Comparative Example C19 was essentially repeated except that the silane pretreated glass beads were further treated with the surfactant of Example 16. The pretreated glass beads were weighed into a 100 ml round bottom flask and covered with 10 ml of water. The appropriate amount of surfactant solution of Example 16 was added to achieve a loading of 50 ppm surfactant based on the weight of the beads. The solvent was removed in vacuo with stirring, and the resulting surfactant-treated beads were removed from the flask and dried in a forced air oven at 120° C. for 1–2 hours.

The results are shown in Table 10.

Example 65

Treatment of Glass Beads with Silane, MeFBSEMA (55%)/CW750 Acrylate (35%)/Acrylic Acid (10%) and MeFBSEA (30%)/CW750 Acrylate (65%)/AMPS (5%)

Example 64 was essentially repeated except that the pretreated glass beads were further treated with a mixture of the surfactant of Example 16 and the surfactant of Example 5 in a 1.5:1 ratio. Thus, using the appropriate amounts of the surfactant solutions of Examples 16 and 5, a combined treatment level of 50 ppm was obtained. Results are shown in Table 10.

TABLE 10

Evaluation of Glass Beads w/wo Silane Pretreatment and w/wo Surfactant Treatment.

| Glass Bead Example | % float in heptane | RA (cd/lux/m$^2$) | Initial Adhesion % embedment | Accelerated Aging Adhesion Test (pass/fail) |
|---|---|---|---|---|
| C19 | 0 | 0.62 | 95 | Pass |
| C20 | 0 | 0.98 | 95 | Pass |
| 64 | 95 | 9.38 | 45 | Pass |
| 65 | 50 | 7.08 | 70 | Pass |

The results in Table 10 show that addition of a surfactant as in Examples 64 and 65 induced the beads to float sufficiently thereby providing a significant increase in retroreflectivity while still maintaining acceptable adhesion.

Comparative Example C21

Dynamic Surface Tension of Water Containing FC-171

The dynamic surface tension of water containing 0.5 weight % FC-171 ($C_8F_{17}SO_2N(Et)(CH_2CH_2O)_{7.5}CH_3$, for which the surface tension was measured in Comparative Example C2, was measured with a Kruss Bubble Pressure Tensiometer, Model BP2 (Kruss USA, Charlotte, N.C.). The results are shown in Table 11.

Example 66

Dynamic Surface Tension of Water Containing $C_4F_9SO_2N(CH_3)(CH_2CH_2O)_{7.5}CH_3$ The dynamic surface tension of water containing 0.5 weight % of the surfactant of Example 1 was measured as in Comparative Example C21. The results are shown in Table 11.

TABLE 11

Dynamic Surface Tension of Water Containing 0.5 Weight % FC-171, or 0.5 Weight % Surfactant of Example 1.

| | | Dynamic Surface Tension (mN/m) at Indicated Bubble Frequency (Hz) | | | |
|---|---|---|---|---|---|
| Example | Surfactant | 0.01 | 0.5 | 1.0 | 5.0 |
| C21 | FC-171 | 51 | 67 | 70 | 71 |
| 66 | Example 1 | 21 | 22 | 22.5 | 23 |

The results in Table 11 show that the surfactant of Example 1 provided a surprisingly low dynamic surface tension over a wide range of frequencies (Example 66), while the dynamic surface tension of FC-171 was higher and even increased as the bubble frequency increased (Comparative Example C21).

Most wetting and sorptive phenomena related to printing, coating, and gluing processes happen within the first second after initial contact between the liquid droplet and the specimen surface. This initial contact effect occurs too early to be studied with manual and static methods. The new methods for measurement of dynamic contact angles have adopted an automated approach where the interaction between a liquid droplet and a specimen surface an be accurately measured with millisecond precision within the first second of contact between the surface and the liquid. As a result wetting (contact angle), sorption (volume), and spreading (droplet base) can be measured as a function of time. In applications where equilibrium is not reached because of rapid coating and flow, the low dynamic contact angle of a surfactant in that system can be a more reliable indicator of its efficacy than static measurements. Low contact angles translate to low surface energy. The contact angles for a system can be converted to surface energies using Young's equation:

$$S_{sv} - S_{sl} = S_{lv} \cos \theta$$

Where $S_{sv}$ is the surface energy of the interface of the solid and vapor, $S_{lv}$ is the surface energy at the liquid vapor interface, $S_{sl}$ is the surface energy of the interface of the solid and liquid, and θ is the contact angle. Spreading occurs at low surface energies and low contact angles and repellent behavior (beading-up) occurs at high surface energies and high contact angles.

Comparative Example C22

Toxicology Study with Perfluorooctanesulfonate

A 28-day oral toxicity study with perfluorooctanesulfonate ($C_8F_{17}SO_3^-$) was conducted by daily gavage in the rat followed by 14 and 28 day recovery periods. The dose levels for the study were selected to be 0 mg/kg body weight/day for species control, and 3 mg/kg body weight/day for potassium perfluorooctanesulfonate. The potassium perfluorooctanesulfonate was formulated in 1% aqueous carboxymethyl cellulose and administered daily for 28 days by oral gavage to SPF-bred Sprague Dawley rats. A vehicle control group and a treated group were tested, each consisting of 8 male and 8 female rats. An extra 3 rats per sex per group were allowed 14 days of recovery, and another 3 rats per sex per group were allowed 28 days of recovery.

Observed effects in treated rats included decreased body weight, decreased blood cholesterol, increased liver size, and hepatocyte hypertrophy. These effects were somewhat more pronounced in the male rats than in the female rats.

Extracted liver tissue samples from the sacrificed rats of the study were homogenized and extracted using an ion-pairing extraction procedure. The extracts were quantitatively analyzed using high-pressure liquid chromatography/electrospray tandem mass spectroscopy (HPLC/ESMS/MS) and evaluated. The amounts of perfluorooctanesulfonate found in the male rat liver tissue samples are shown in Table 12.

Comparative Example C23

Toxicology Study with Perfluorohexanesulfonate

Comparative Example C22 was repeated except using perfluorohexanesulfonate instead of perfluorooctanesulfonate, and using a dose level of 10 mg/kg body weight/day. Observed effects were comparable, but less persistent than those of Comparative Example C22. The amounts of perfluorohexanesulfonate found in the male rat liver tissue samples are shown in Table 12.

Example 67

Toxicology Study with Perfluorobutanesulfonate

Comparative Example C22 was repeated except using perfluorobutanesulfonate instead of perfluorooctanesulfonate, and using a dose level of 30 mg/kg body weight/day. No clear systematic toxicity, nor organ dysfunction at macroscopic or microscopic levels were observed. The amounts of perfluorobutanesulfonate found in the male rat liver tissue samples are shown in Table 12.

TABLE 12

Amounts of Perfluoroalkylsulfonate Found in Male Rat Liver Tissue After 28 Day Feeding

| Example | Sulfonate | Day 1 | Day 1N* | Day 14 | Day 14N* | Day 28 | Day 28N* |
|---|---|---|---|---|---|---|---|
| C22 | $C_8F_{17}SO_3^-$ | 419 ± 86 | 419 | 309 + 34 | 309 | 237 ± 25 | 237 |
| C23 | $C_6F_{13}SO_3^-$ | 327 ± 52 | 98 | 61.9 ± 11.7 | 19 | 36.3 ± 7.4 | 11 |
| 67 | $C_4F_9SO_3^-$ | 3.09 ± 1.58 | 0.31 | 0.126 ± 0.084 | 0.0126 | 0.025 ± 0.015 | 0.0025 |

*Normalized to a feeding level of 3 mg/kg body weight per day.

The results in Table 12 show unexpectedly fast and effective elimination of $C_4F_9SO_3^-$ (Example 67) as demonstrated by the extremely small amounts found, particularly relative to $C_6F_{13}SO_3^-$ and $C_8F_{17}SO_3^-$ (Comparative Examples C22 and C23). Immediately following completion of feeding, $C_6F_{13}SO_3^-$ was a factor of 1.3 lower than $C_8F_{17}SO_3^-$, but $C_4F_9SO_3^-$ was more than a factor of 100 lower than $C_6F_{13}SO_3^-$. At 28 days following completion of feeding, $C_6F_{13}SO_3^-$ was a factor of 6.5 lower than $C_8F_{17}SO_3^-$, but $C_4F_9SO_3^-$ was more than a factor of 1400 lower than $C_6F_{13}SO_3^-$. After normalization to the same feeding levels, at 28 days following completion of feeding, $C_6F_{13}SO_3^-$ was a factor of 21.5 lower than $C_8F_{17}SO_3^-$, but $C_4F_9SO_3^-$ was a factor of 4400 lower than $C_6F_{13}SO_3^-$.

We claim:

1. A surfactant mixture comprising:
(a) polymeric surfactant of the formula

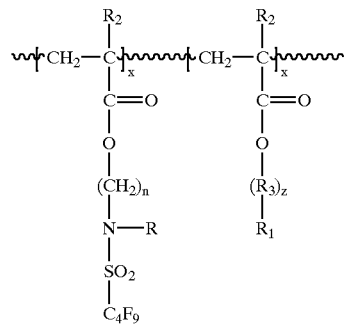

wherein ∿∿∿ represent a bond in a polymerizable or polymer chain;
R, $R_1$ and $R_2$ are each independently hydrogen or alkyl of 1 to 4 carbon atoms;
$R_3$ is at least one or more straight or branched alkyleneoxy groups, linked together and having 2 to 6 carbon atoms, or a straight or branched alkylene group having 12 to 20 carbon atoms;
n is an integer from 2 to 10; and
x, y and z are integers of at least 1, and
(b) a compound of the formula

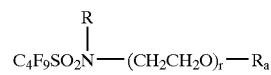

wherein R is hydrogen or alkyl of 1–4 carbon atoms;
$R_a$ is hydrogen or alkyl of 1 to 4 carbon atoms; and
r is an integer of 2 to 20.

2. The mixture of claim 1 wherein component (b) is of the formula

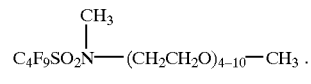

3. A polymeric surfactant comprising the reaction product of:
(a) a compound of the formula

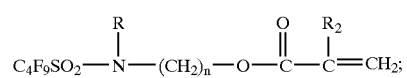

(b) a compound selected from the group consisting of

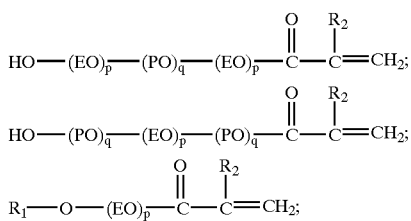

or mixtures thereof; and (c) a compound of the formula

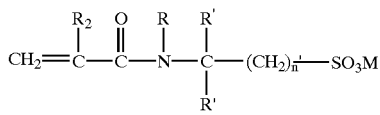

wherein R, $R_1$, $R_2$, R' are hydrogen or alkyl of 1 to 4 carbon atoms;
p is an integer of 1 to about 128;
q is an integer of 0 to about 55;
n is an integer of 2 to about 10;
n' is an integer of 1 to about 10; and
M is hydrogen or a cation.

4. The surfactant of claim 3 wherein said surfactant comprises the reaction product of (a), (b), (C), and (d) wherein (d) is a compound of the formula A-O—C(=O)C($R_2$)=$CH_2$ wherein A is an amine-containing group.

5. The surfactant of claim 3 wherein said surfactant comprises the reaction product of (a), (b), (C), and (d) wherein (d) is a compound of the formula $R_h$—O—C(=O)C($R_2$)=$CH_2$ wherein $R_h$ is an alkyl of 12 to 20 carbon atoms.

6. A surfactant according to claim 3, wherein compound (c) is of the formula

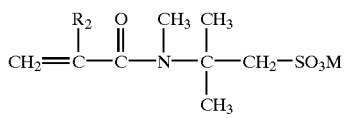

where $R_2$ is hydrogen or methyl and M is hydrogen, potassium, ammonium, lithium, or a protonated tertiary amine.

7. A polymeric surfactant comprising the reaction product of:

(a) a compound of the formula

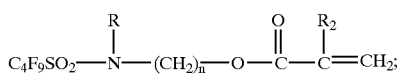

(b) a compound selected from the group consisting of

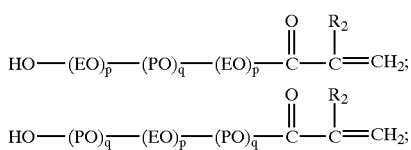

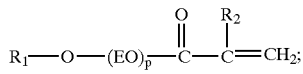

mixtures thereof; and (c) a compound of the formula M-O—C(=O)—C($R_2$)=$CH_2$
wherein R, $R_1$, $R_2$, and R' are independently hydrogen or alkyl of 1 to 4 carbons atoms;
n is an integer of 2 to about 10; and
M is H, potassium, sodium, ammonium, or protonated tertiary amine.

8. The surfactant of claim 7 wherein said surfactant comprises the reaction product of (a), (b), (c), and (d) wherein (d) is a compound of the formula A-O—C(=O)C($R_2$)=$CH_2$ wherein A is an amine-containing group.

9. The surfactant of claim 7 wherein said surfactant comprises the reaction product of (a), (b), (c), and (d) wherein (d) is a compound of the formula $R_h$—O—C(=O)C($R_2$)=$CH_2$ wherein $R_h$ is an alkyl of 12 to 20 carbon atoms.

10. A method of reducing the surface tension of a liquid comprising adding to said liquid a polymeric surfactant comprising the reaction product of:

(a) a compound of the formula

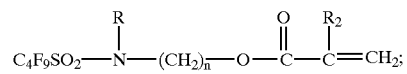

and (b) a compound selected from the group consisting of

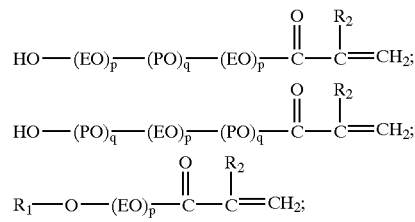

or mixtures thereof, wherein R, $R_1$ and $R_2$ are each independently hydrogen or alkyl of 1 to 4 carbon atoms;
n is an integer from 2 to 10;
p is an integer of 1 to about 128; and
q is an integer of 0 to about 54.

11. The method of claim 10 wherein said surfactant comprises the reaction product of (a), (b) and (c) wherein (c) is a compound of the formula:

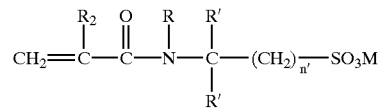

wherein R, $R_2$, R' are each hydrogen or alkyl of 1–4 carbon atoms;
n' is an integer of 1–10; and
M is hydrogen or a cation.

12. The method of claim 11, wherein

R$_2$ is hydrogen or methyl; R is methyl;

R' is methyl;

n is 1; and

M is potassium or a protonated tertiary amine.

13. A method of reducing the surface tension of a liquid comprising adding to said liquid a polymeric surfactant of the formula:

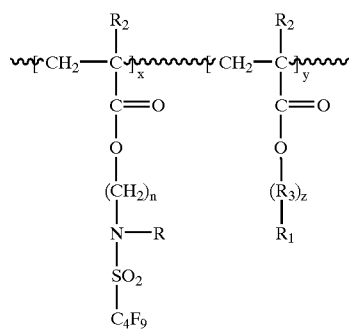

wherein ∿∿∿∿ represents a bond in a polymerizable or polymer chain;

R, R$_1$ and R$_2$ are each independently hydrogen or alkyl of 1 to 4 carbon atoms;

R$_3$ is at least one or more straight or branched alkyleneoxy groups, linked together and having 2 to 6 carbon atoms, or a straight or branched alkylene group having 12 to 20 carbon atoms;

n is an integer from 2 to 10; and x, y and z are integers of at least 1.

14. The method according to claim 13, wherein in the surfactant, R$_3$ is of the formula (PO)$_q$-(EO)$_p$-(PO)$_q$ and R and R$_1$ are methyl, q is 0 and p is from about 4 to about 10.

15. The method according to claim 13, wherein in the surfactant, R$_3$ is of the formula (EO)$_p$-(PO)$_q$-(EO)$_p$ is about 21.

16. The method according to claim 15, wherein in the surfactant, R is methyl.

17. A method of reducing the surface tension of a liquid that comprises adding a surface-active agent to the liquid of the formula

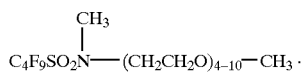

18. A method of reducing the surface tension of a liquid comprising adding a mixture of:

(a) polymeric surfactant of the formula

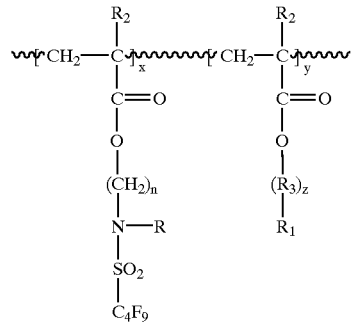

wherein ∿∿∿∿ represents a bond in a polymerizable or polymer chain;

R, R$_1$ and R$_2$ are each independently hydrogen or alkyl of 1 to 4 carbon atoms;

R$_3$ is at least one or more straight or branched alkyleneoxy groups, linked together and having 2 to 6 carbon atoms, or a straight or branched alkylene group having 12 to 20 carbon atoms;

n is an integer from 2 to 10; and x, y and z are integers of at least 1; and (b) a compound of the formula

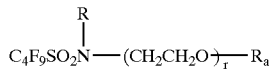

where R is hydrogen or alkyl of 1–4 carbons;

R$_a$ is hydrogen or alkyl of 1–4 carbon atoms; and r is an integer from 2 to 20.

19. The method of claim 18, where component (b) is a compound of the formula

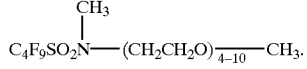

* * * * *

UNITED STATES PATENT AND TRADEMARK OFFICE
CERTIFICATE OF CORRECTION

PATENT NO.    : 6,852,781 B2
DATED         : February 8, 2005
INVENTOR(S)   : Savu, Patricia M.

It is certified that error appears in the above-identified patent and that said Letters Patent is hereby corrected as shown below:

Column 1,
Line 58, delete "C8F$_{17}$SO$_2$N" and insert -- C$_8$F$_{17}$SO$_2$N --, therefor.

Column 4,
Line 60, after "OF" delete "THE".

Column 22,
Line 56, delete "C$_4$F$_9$SO$_2$N(CH$_3$)CH$_2$ OH" and insert -- C$_4$F$_9$SO$_2$N(CH$_3$)CH$_2$CH$_2$OH --, therefor.

Column 23,
Line 61, delete "(C4F$_9$SO$_2$N(CH$_3$)" and insert -- (C$_4$F$_9$SO$_2$SO$_2$N(CH$_3$) --, therefor.

Column 25,
Line 43, delete "MeEBSEA" and insert -- MeFBSEA --, therefor.

Column 28,
Line 54, delete "MeEBSEMA" and insert -- MeFBSÈMA --, therefor.

Column 29,
Line 47, after "1000" delete "mil" and insert -- ml --, therefor.

Column 38,
Line 2, after "Procedure" delete "m" and insert -- III --, therefor.

Column 39,
Line 56, delete "calorimeter" and insert -- colorimeter --, therefor.

Column 52,
Lines 5-10, delete " 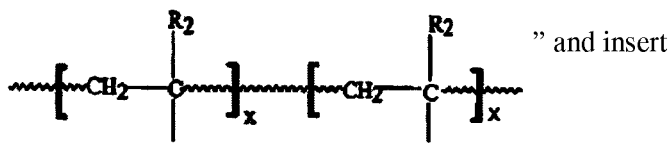 " and insert

-- 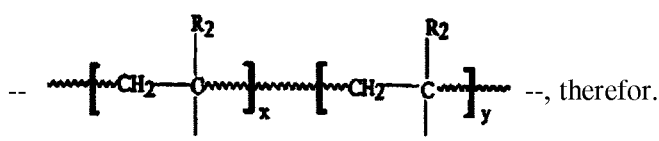 --, therefor.

Line 17, delete "represent" and insert -- represents --, therefor.

UNITED STATES PATENT AND TRADEMARK OFFICE
CERTIFICATE OF CORRECTION

PATENT NO. : 6,852,781 B2
DATED : February 8, 2005
INVENTOR(S) : Savu, Patricia M.

It is certified that error appears in the above-identified patent and that said Letters Patent is hereby corrected as shown below:

Column 53,
Lines 31 and 35, delete "(C)" and insert -- (c) --, therefor.

Column 55,
Line 43, after "$(EO)_p$-$(PO)_q$-$(EO)_p$" insert -- ; p is about 11 and q --.

Signed and Sealed this

Twenty-second Day of November, 2005

JON W. DUDAS
*Director of the United States Patent and Trademark Office*